US008780417B2

(12) United States Patent  (10) Patent No.: US 8,780,417 B2
Yamamura  (45) Date of Patent: Jul. 15, 2014

(54) LENS ARRAY, LENS UNIT, LED HEAD, EXPOSURE DEVICE, IMAGE FORMATION APPARATUS, AND IMAGE READING APPARATUS

(71) Applicant: Oki Data Corporation, Tokyo (JP)

(72) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/683,089

(22) Filed: Nov. 21, 2012

(65) Prior Publication Data

US 2013/0135694 A1  May 30, 2013

(30) Foreign Application Priority Data

Nov. 25, 2011  (JP) .................................. 2011-257597

(51) Int. Cl.
*H04N 1/04* (2006.01)
(52) U.S. Cl.
USPC .............. 358/474; 358/475; 359/629; 385/33
(58) Field of Classification Search
CPC .... G02B 3/0056; G02B 3/005; G02B 3/0062; G02B 3/0031; G02B 3/0068; G02B 3/0006; G02B 13/26; G02B 27/2214; G02B 5/003; G02B 5/008; G02B 27/0101; G02B 3/0012; G02B 3/0043; G02B 5/0215
USPC ................. 358/302, 474, 482, 483, 475, 509; 359/362, 268, 621, 739, 619, 221, 624, 359/626, 622, 623, 630; 385/33, 129, 120
See application file for complete search history.

(56) References Cited

U.S. PATENT DOCUMENTS

| | | | | | |
|---|---|---|---|---|---|
| 4,543,491 | A | * | 9/1985 | Tateoka et al. | 358/474 |
| 4,626,082 | A | * | 12/1986 | Mochizuki et al. | 359/362 |
| 4,676,596 | A | * | 6/1987 | Kato et al. | 359/619 |
| 5,035,486 | A | * | 7/1991 | Inokuchi | 359/625 |
| 5,973,840 | A | * | 10/1999 | Itoh et al. | 359/618 |
| 6,101,040 | A | * | 8/2000 | Itoh | 359/622 |
| 6,473,238 | B1 | * | 10/2002 | Daniell | 359/622 |
| 6,490,094 | B2 | * | 12/2002 | Daniell | 359/622 |
| 6,693,748 | B1 | * | 2/2004 | Fujimoto et al. | 359/621 |
| 6,801,345 | B1 | * | 10/2004 | Imamura | 358/509 |
| 6,956,163 | B2 | * | 10/2005 | McFarland | 136/255 |
| 7,177,082 | B2 | * | 2/2007 | Wakisaka et al. | 359/619 |
| 7,864,241 | B2 | * | 1/2011 | Iwasaki | 348/360 |
| 7,933,070 | B2 | * | 4/2011 | Yamamura | 359/621 |
| 8,274,742 | B2 | * | 9/2012 | Yamamura | 359/621 |

FOREIGN PATENT DOCUMENTS

JP  2008-092006 A  4/2008

* cited by examiner

*Primary Examiner* — Negussie Worku
(74) *Attorney, Agent, or Firm* — Marvin A. Motsenbocker; MOTS Law, PLLC

(57) ABSTRACT

A lens array includes a first lens row including first lenses arranged in a first direction, a second lens row including second lenses arranged in a direction substantially parallel with the first direction, a first boundary being a boundary between the first lenses adjacent to each other, a second boundary being a boundary between each of the first lenses and the second lens adjacent to the first lens, and a first join portion where the first boundary and the second boundary join each other. At the first joint portion, the first boundary and the second boundary contact each other with no step as seen in a plane that is substantially orthogonal to the first direction.

20 Claims, 17 Drawing Sheets

Comparison example

Comparison example

Comparison example

Comparison example

LENS ARRAY, LENS UNIT, LED HEAD, EXPOSURE DEVICE, IMAGE FORMATION APPARATUS, AND IMAGE READING APPARATUS

CROSS REFERENCE TO RELATED APPLICATIONS

This application claims priority based on 35 USC 119 from prior Japanese Patent Application No. 2011-257597 filed on Nov. 25, 2011, entitled "LENS ARRAY, LENS UNIT, LED HEAD, EXPOSURE DEVICE, IMAGE FORMATION APPARATUS, AND IMAGE READING APPARATUS", the entire contents of which are incorporated herein by reference.

BACKGROUND OF THE INVENTION

Field of the Invention

This disclosure relates to optical systems of an image formation apparatus and an image reading apparatus, such as an exposure device of the image formation apparatus and a reading head of the image reading apparatus.

Heretofore, an optical system configured to form a same-size erect image of an object in a line is used in an electrophotographic image formation apparatus using as an exposure device an LED head in which LEDs are continuously arranged, or is used in an image reading apparatus, such as a scanner or a facsimile machine, configured to form an image of an original document on a light reception unit in which light reception elements are continuously arranged. Meanwhile, it is known that such an optical system in which microlenses are arranged substantially linearly to form a same-size erect image of an object can form a high-resolution same-size erect image of an object (for example, see Patent Document 1: Japanese Patent Application Publication No. 2008-92006 (pp. 5 and 6 and FIG. 1)).

SUMMARY OF THE INVENTION

However, there is a demand for a further increase in resolution of the image formation apparatus and the image reading apparatus by increasing the contrast of an image formed by means of the microlenses.

An aspect of the invention is a lens array including: a first lens row including first lenses arranged in a first direction; a second lens row including second lenses arranged in a direction substantially parallel with the first direction; a first boundary being a boundary between the first lenses adjacent to each other; a second boundary being a boundary between each of the first lenses and the second lens adjacent to the first lens; and a first join portion where the first boundary and the second boundary join each other. At the first join portion, the first boundary and the second boundary contact each other without a step as seen in a plane that is substantially orthogonal to the first direction.

According to the aspect(s) of the invention, no step which incurs the entrance of stray light is formed. This makes it possible to prevent the contrast of an image from being reduced due to the entrance of stray light through the step, and thereby to form a high-contrast image.

DETAILED DESCRIPTION OF EMBODIMENTS

Figure 1:
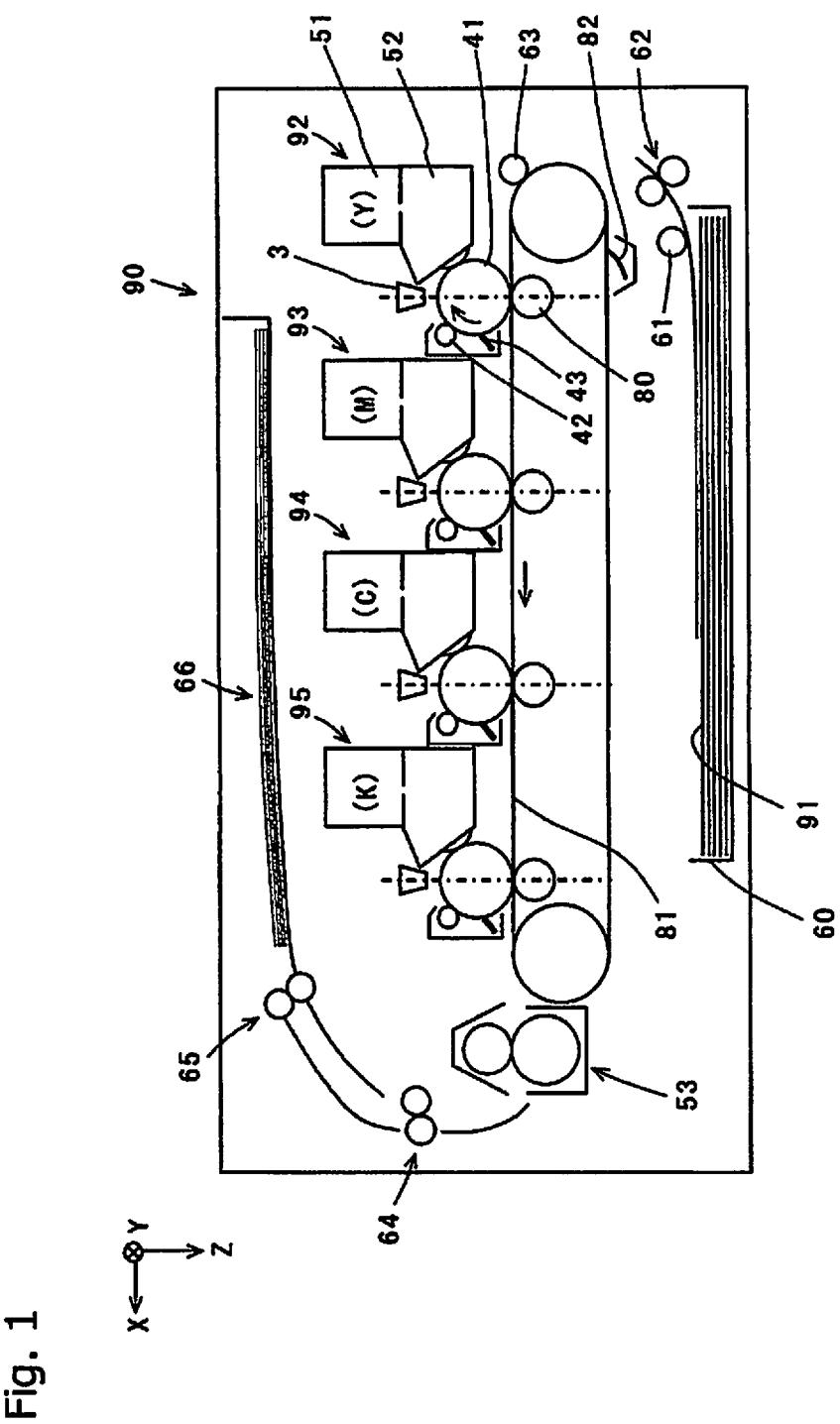
FIG. 1 is a main part configuration diagram showing the main part configuration of a color printer as an image formation apparatus according to a first embodiment of the invention.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

FIG. 1 is a main part configuration diagram showing the main part configuration of a color printer as an image formation apparatus according to the first embodiment of the invention. Color printer 90 shown in FIG. 1 is a color electrophotographic printer, and is configured to form an image on a print medium in accordance with image data by using toner made of a resin which contains a pigment as a coloring material.

Paper cassette 60 is attached to color printer 90 and is configured to store a stack of recording paper 91 as media. Moreover, feed roller 61 and transport rollers 62 and 63 are arranged in color printer 90. Feed roller 61 is configured to pick up recording paper 91 from paper cassette 60, and transport rollers 62 and 63 are configured to transport recording paper 91 to image formation units. Further, in color printer 90, toner image formation units 92 to 95 as the image formation units are arranged in this order from an upstream side along a transport path of recording paper 91 transported in a direction indicated by an arrow in FIG. 1. Toner image formation units 92 to 95 are configured to form toner images of yellow (Y), magenta (M), cyan (C), and black (K), respectively. These toner image formation units have the same configuration except that they use their own predetermined colors.

Each of the toner image formation units includes, as shown, for example, in toner image formation unit 92 using yellow (Y) toner: photosensitive drum 41 serving as an electrostatic latent image carrier configured to rotate in a direction indicated by an arrow; charging roller 42 configured to supply electric charges to, and thereby to electrically charge, a surface of photosensitive drum 41; LED head 3 serving as an exposure device configured to selectively irradiate the charged surface of photosensitive drum 41 with light in accordance with image data and thereby to form an electrostatic latent image thereon; developer 52 configured to develop a toner image on photosensitive drum 41 by supplying the toner to the electrostatic latent image formed on photosensitive drum 41; toner cartridge 51 configured to supply the toner to developer 52; and cleaning blade 43 disposed in contact with photosensitive drum 41 and configured to scrape the residual toner off the surface of photosensitive drum 41.

In color printer 90, there are also provided: transfer belt 81 serving as a transfer unit configured to transport recording paper 91; transfer rollers 80 each disposed opposite to corresponding photosensitive drum 41 in such a way as to sandwich transfer belt 81 and configured to transfer, onto recording paper 91, the toner image being an image formed on photosensitive drum 41 by visualizing the electrostatic latent image by use of the toner; and cleaning blade 82 configured to subject transfer belt 81 to cleaning by scraping off the toner attached to transfer belt 81. Additionally, there are provided: fixation unit 53 configured to fix the toner image formed on recording paper 91 by application of heat and pressure; transport rollers 64 configure to transport recording paper 91 after passage of fixation unit 53; and discharge rollers 65 configured to discharge recording paper 91 to discharge portion 66 in which to keep a stack of recording paper 91 having the image fixed thereon.

An unillustrated power supply applies predetermined voltages to charging rollers 42 and transfer rollers 80. Transfer belt 81, photosensitive drums 41, feed roller 61, transport rollers 62 to 64, and discharge rollers 65 are driven to rotate by unillustrated motors and unillustrated drive transmission gears. In addition, the unillustrated power supply and a control device are connected to developers 52, LED heads 3, fixation units 53, and the unillustrated motors.

Color printer 90 also includes an external interface configured to receive print data from an external device through communications with the external device, and a controller configured to perform overall control over color printer 90 upon receiving the print data from the external interface. However, these parts have no direct relation with the invention and therefore are not described in detail.

It should be noted that, in FIG. 1, an X direction is a direction in which recording paper 91 is transported when passing through toner image formation units 92 to 95; a Y direction is a rotational axis direction of each photosensitive drum 41; and a Z direction is a direction orthogonal to these two directions. In addition, the X direction, the Y direction, and the Z direction shown in each of FIGS. 2 to 11 and FIGS. 15 to 17 described later respectively indicate the same directions as those shown in FIG. 1. In other words, the XYZ directions in each of the drawings indicate directions in which depicted parts in the drawing are disposed when mounted in image formation apparatus 1 shown in FIG. 1. Further, in FIG. 1, the image formation apparatus is disposed in such a way that the Z direction extends in a substantially vertical direction and the +Z direction (the direction in which arrow Z is directed) is directed toward the lower end in the vertical direction.

Figure 2:
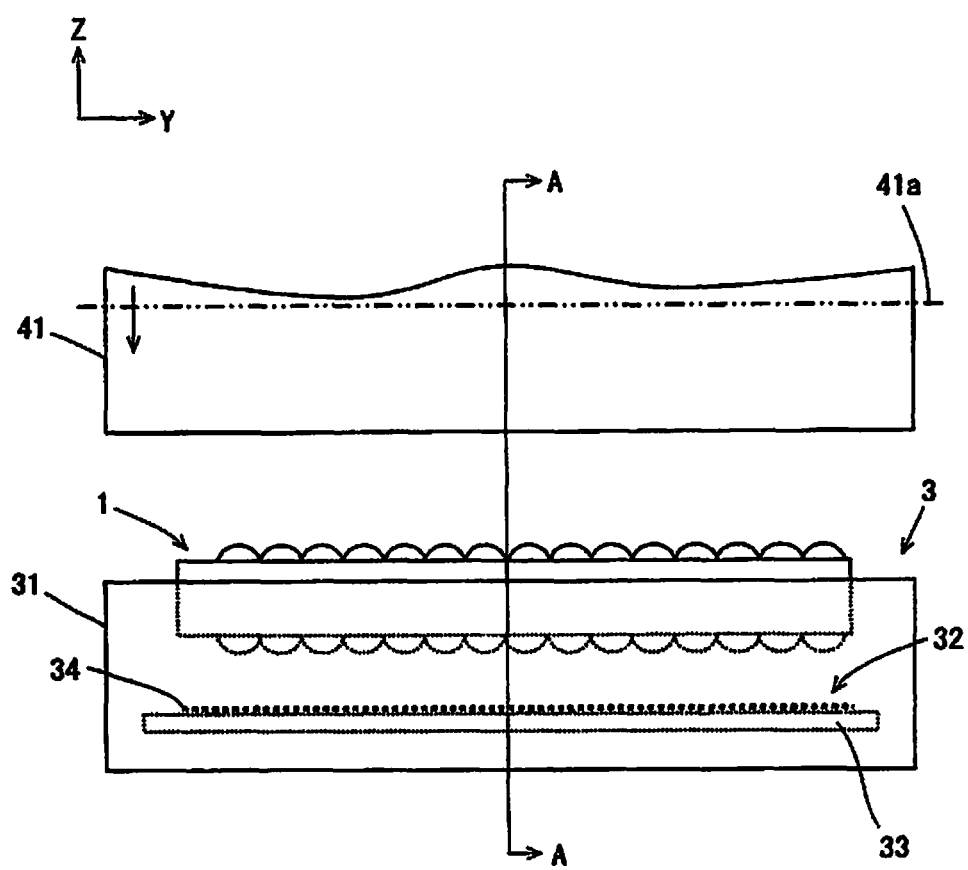
FIG. 2 is a schematic configuration diagram showing a set of an LED head and a photosensitive drum seen from the positive side in an X direction, and is upside down with respect to FIG. 1.

FIG. 2 is a schematic configuration diagram showing a set of LED head 3 and photosensitive drum 41 as seen from the positive side in the X direction. FIG. 2 is upside down with respect to FIG. 1. Photosensitive drum 41 rotates in a direction indicated by an arrow in FIG. 2.

LED head 3 includes: lens unit 1; holder 31; and LED array 32. Holder 31 holds lens unit 1 and LED array 32 in a predetermined positional relationship described later. LED array 32 as a light emission unit includes LED elements 34 arranged substantially linearly on substrate 33. LED array 32 is held in such a way that LED elements 34 are arranged in the Y direction (the rotational axis direction of photosensitive drum 41). Lens unit 1 is also held in such a way that its long-side direction is parallel with that of LED array 32. Accordingly, in LED head 3, LED array 32 and lens unit 1 are disposed in such a way that both the arrangement direction of LED elements 34 of LED array 32 and the long-side direction of lens unit 1 are parallel with the center of rotational axis 41a of photosensitive drum 41. As described later, microlenses are arranged in lens unit 1 in such a way that the optical axis of each microlens extends in the Z direction (the vertical direction in FIG. 2).

Figure 3:
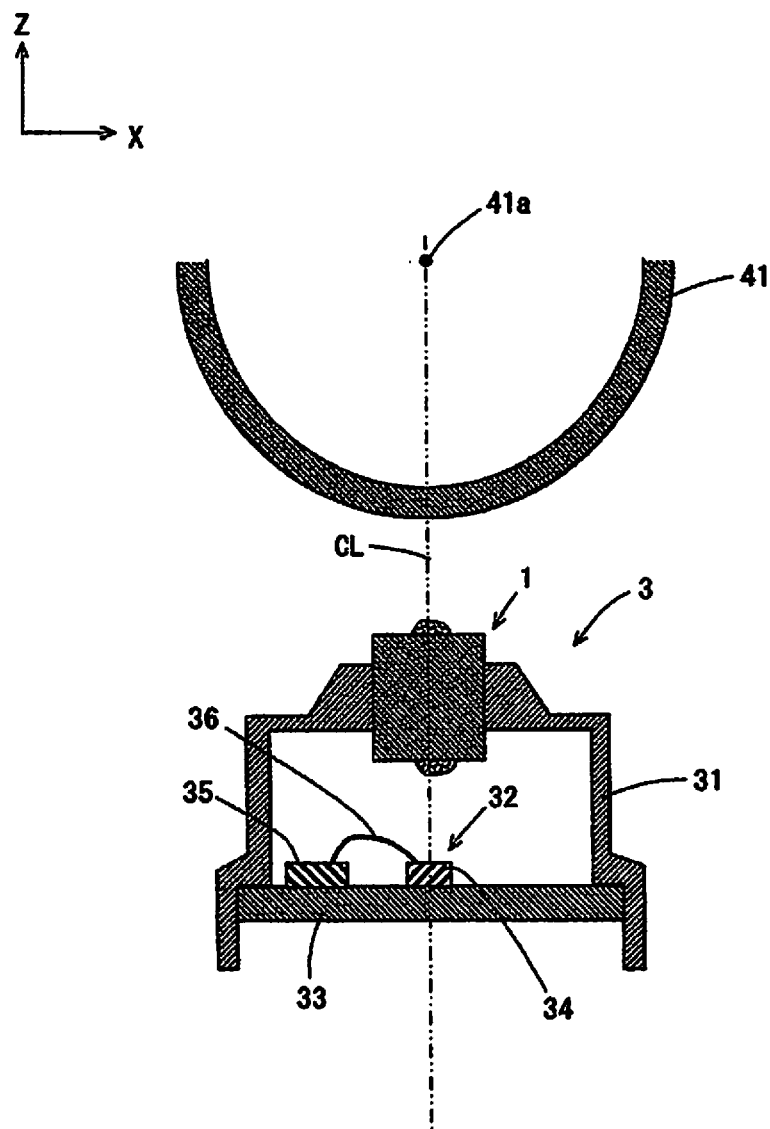
FIG. 3 is a cross-sectional view of the LED head and the photosensitive drum taken along line A-A of FIG. 2.

FIG. 3 is a cross-sectional view of lens unit 1 and photosensitive drum 41 taken along line A-A in FIG. 2. Lens unit 1 is disposed with its width direction aligned with the X direction which is orthogonal to both the Z direction, being an optical axis direction of each of the microlenses, and the Y direction being the long-side direction of lens unit 1. Accordingly, when the optical axis of each microlens is set to extend in the vertical direction, the width direction of lens unit 1 is a horizontal direction. With the center line of lens unit 1 in the width direction of lens unit 1 designated as CL, the center of LED array 32 and the center of rotational axis 41a of photosensitive drum 41 are located on an extrapolated straight line from center line CL in the width direction in FIG. 3. In addition, LED elements 34 and driver IC 35 configured to drive LED elements 34 are disposed on substrate 33. Each LED element 34 and drive IC 35 are connected together with wire 36 and are thereby electrically connected to each other.

In this embodiment, LED head 3 has a resolution of 1200 dpi, and 1200 LED elements 34 of LED array 32 are arranged per inch (1 inch=about 25.4 mm). In other words, LED elements 34 are arranged at a pitch PD of 0.02117 mm.

Figure 4:
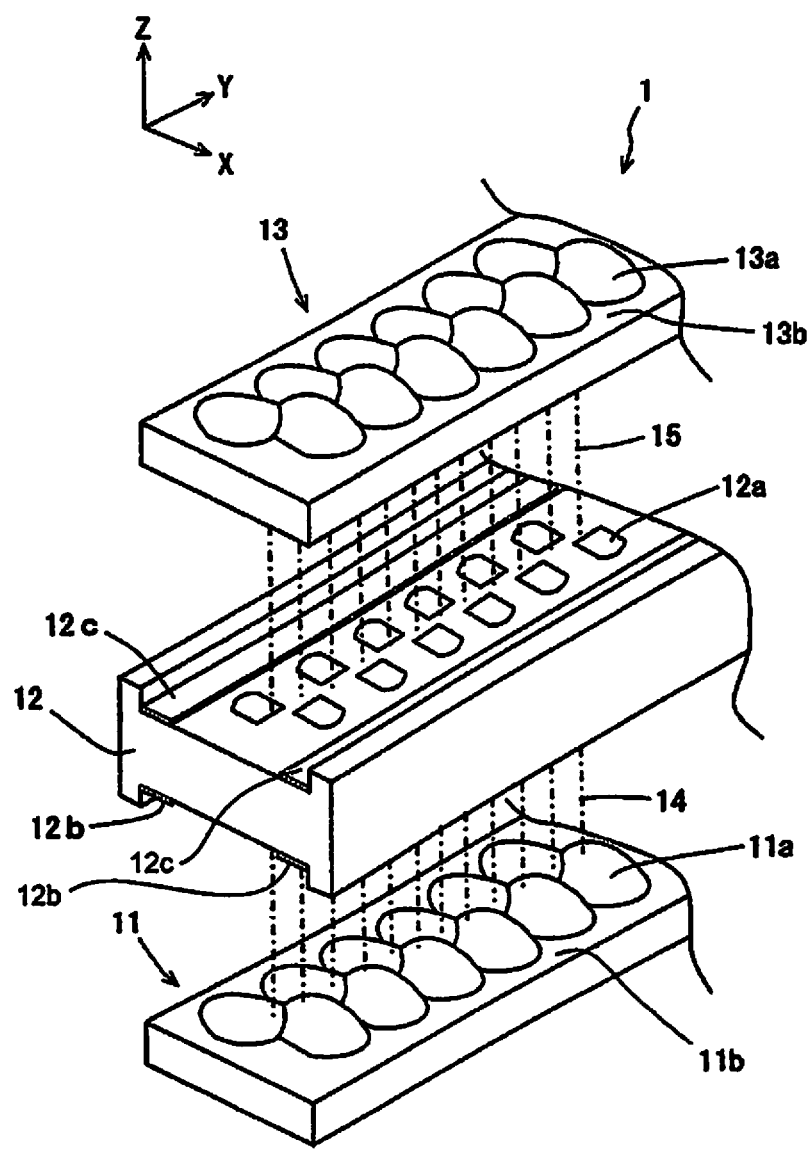
FIG. 4 is an exploded perspective view of lens unit 1 according to the first embodiment, where the disposition in FIG. 4 is upside down with respect to that in FIG. 1.

FIG. 4 is an exploded perspective view of lens unit 1 according to this embodiment. The disposition in FIG. 4 is upside down with respect to that in FIG. 1.

Lens unit 1 includes: first lens plate 11 serving as a first lens array disposed on an object side (on a light emission unit side); second lens plate 13 serving as a second lens array disposed on an image side; and light shield plate 12 serving as a light shield member disposed between these lens plates. As shown in FIG. 4, first lens plate 11 and second lens plate 13 are disposed opposite to each other with light shield plate 12 interposed therebetween. First lens plate 11 includes a flat plate portion 11b and microlenses 11a staggered in two rows. In the same manner, second lens plate 13 includes a flat plate portion 13b and microlenses 13a staggered in two rows.

First lens plate 11 is fixed at its two ends to fixing portion 12b of light shield plate 12, whereas second lens plate 13 is fixed at its two ends to fixing portion 12c of light shield plate 12. First and second lens plates 11 and 13 are disposed in such a way that optical axis 14 of each microlens 11a of first lens plate 11 and optical axis 15 of each microlens 13a of second lens plate 13 extend in the Z direction (the vertical direction in FIG. 4). Apertures 12a serving as diaphragms are formed in light shield plate 12. Microlenses 11a of first lens plate 13 and microlenses 13a of second lens plate 13 are arranged at the same intervals, and their optical axes 14 and 15 match each other. To put it another way, lens unit 1 has such a configuration that: a lens group includes the diaphragms and the pair of lens arrays arranged in such a way that optical axes 14 and 15 of respective opposing microlenses 11a and 13a match each other; and the lens group is disposed substantially linearly in the long-side direction (the Y direction) of lens unit 1 which is perpendicular to the optical axes.

Figure 5:
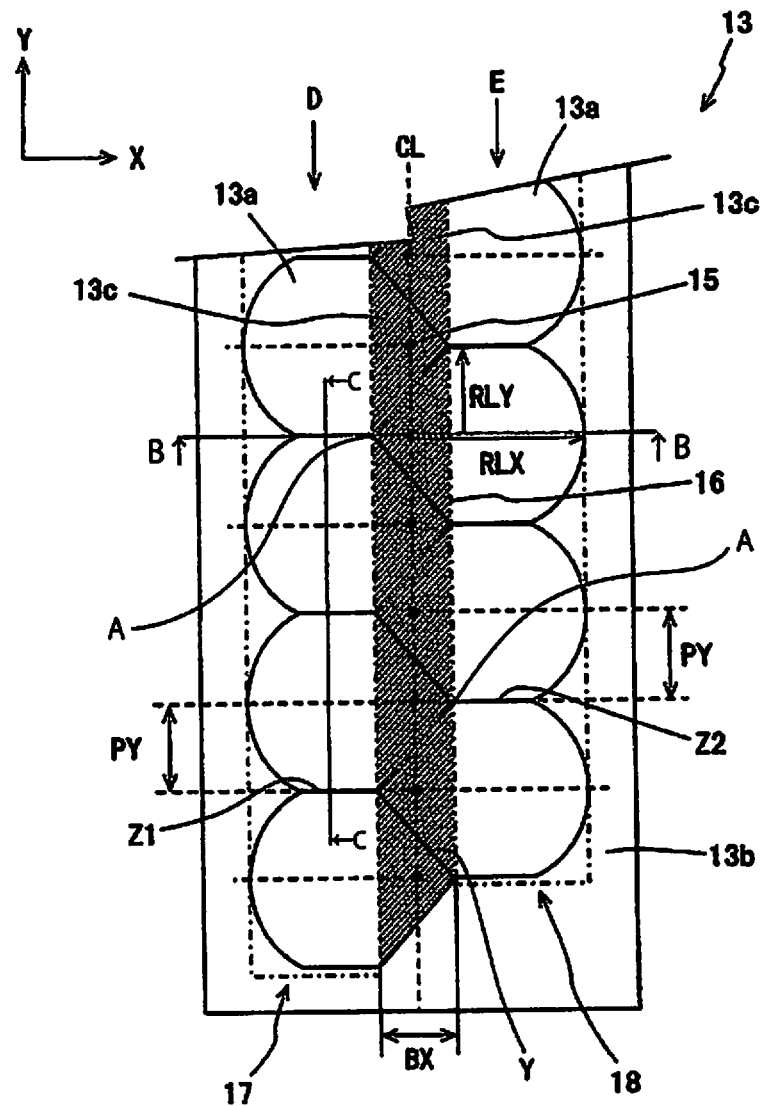
FIG. 5 is a plan view of the second lens plate shown in FIG. 4.

FIG. 5 is a plan view of second lens plate 13 shown in FIG. 4. Note that, because first lens plate 11 (first lens array 11) and second lens plate 13 (second lens array 13) have substantially the same configuration, the configuration of only second lens plate 13 is described below and the configuration of first lens plate 11 is not described.

As shown in FIG. 5, second lens plate 13 has microlenses 13a staggered in two rows, and optical axis 15 of each microlens 13a is located on center line CL in the width direction of lens unit 1. Among these two rows of microlenses 13a, first lens row 17 is the row formed on one side shown by an arrow D, whereas second lens row 18 is the row formed on the other side shown by an arrow E. Microlenses 13a in first lens row 17 (first lenses 13a) are arranged in the long-side direction of second lens plate 13 (the Y direction) at an interval of 2×PY, where PY=the lens arrangement interval. In other words, an interval between the optical axes of first lenses (microlenses 13a in first lens row 17) is equal to 2×PY in the arrangement direction (the Y direction). Microlenses 13a in second lens row 18 (second lenses 13a) are arranged in the long-side direction of second lens plate 13 (the Y direction) at an interval of 2×PY. In other words, an interval between the optical axes of second lenses 13a (microlenses 13a in second lens row 18) is equal to 2×PY in the arrangement direction (the Y direction). Each first lens 13a (microlens 13a in first lens row 17) and corresponding second lens 13a (microlens 13a in second lens row 18), which are adjacent to each other, are arranged at an interval of PY in the Y direction. In other words, the optical axis of each first lens 13a (microlens 13a in first lens row 17) and the optical axis of corresponding second lens 13a (microlens 13a in second lens row 18), which is adjacent to first lens 13a (microlens 13a in first lens row 17), have an interval of PY in the Y direction.

Here, straight line CL is a virtual line extending parallel with the arrangement direction of first and second lens rows 18.

In second lens plate 13 of this embodiment, there is a boundary region (hatched portion) 16 between first and second lens rows 17 and 18. An area of each microlens 13a that overlaps with boundary region (hatched portion) 16 is called boundary portion 13c. Boundary portion 13c of each microlens 13a, between two adjacent boundaries Y, has a curved surface having no step extending in the direction of the optical axis 15 (in the Z direction) as described later. Here, BX is the width of boundary region 16 in the width direction (the X direction) of lens unit 1.

Microlenses 13a in first lens row 17 and microlenses 13a in second lens row 18 are arranged seamlessly and continuously in such a way that boundary portions 13c of microlens 13a extending from the main body of microlens 13a contact each other in a zigzag manner. To put it differently, distance RLY between the center and one end portion of each microlens 13a in the arrangement direction (the Y direction) is equal to the lens arrangement interval PY. With this arrangement, RLX>RLY is satisfied, where RLX indicates a radius of each microlens 13a about optical axis 14 of the microlens in the width direction of lens unit 1 (the X direction, the horizontal direction).

Microlenses 13a in second lens row 18, including boundary portions 13c, have the same configuration as microlenses 13a in first lens row 17, including boundary portions 13c which are rotated by 180 degrees about optical axes 15 as rotational axes. Accordingly, in this embodiment, boundary portions 13c, contacting each other in a zigzag manner, are in the form of isosceles right triangles when seen in the Z direction. Further, in this embodiment, first lens plate 11 has the same configuration as second lens plate 13.

When Z1 is a boundary between every two adjacent first lenses 13a (that is, microlenses 13a in first lens row 17) and Z2 is a boundary between every two adjacent second lenses 13a (that is, microlenses 13a in second lens row 18), boundary Z1 and boundary Z2 extend substantially linearly in a short-side direction of second lens plate 13 (the X direction). Moreover, when Y is a boundary between first lens 13a (that is, microlens 13a in first lens row 17) and second lens 13a (microlens 13a in second lens row 18) adjacent to each other, boundary Y extends substantially linearly. Thus, microlenses 13a forming second lens plate 13 have substantially the same shape, and therefore the amounts of light passing through microlenses 13a are uniform. The configuration of first lens plate 11 is not described here because this is the same as that of second lens plate 13.

First lens plate 11 and second lens plate 13 are made of a material which transmits light rays from the light emission unit. In this embodiment, the microlenses are integrally made by injection molding from an optical resin of a cycloolefin type (product name: ZEONEX E48R, produced by ZEON corporation).

Figure 6:
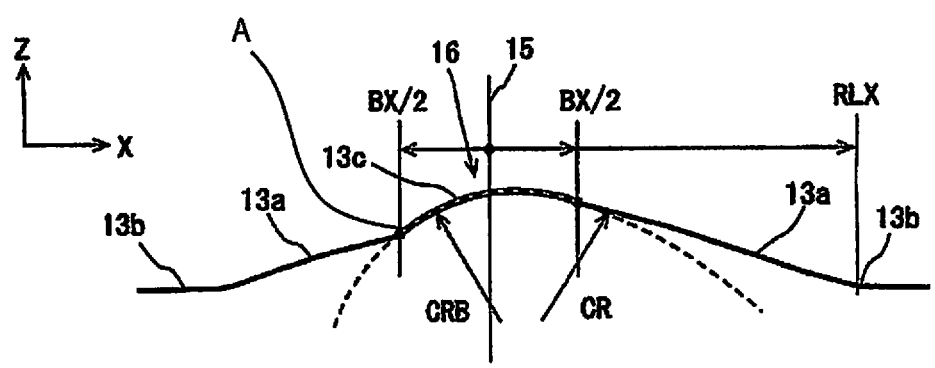
FIG. 6 is a cross-sectional view of the second lens plate taken along plane B-B of FIG. 5.

FIG. 6 is a cross-sectional view of the second lens plate shown in FIG. 5 taken along plane B-B which is parallel with the width direction of the lens plate and passes through boundary Z1. As shown in FIG. 6, boundary region 16 includes a region formed between optical axis 15 (center line CL) and a point BX/2 in the −X direction and a region formed between optical axis 15 (center line CL) and a point BX/2 in the +X direction. Boundary portion 13c of each microlens 13a, defined by and between every two adjacent boundaries Y, has a curved surface having a radius of curvature CRB. The main body of microlenses 13a in second lens row 18 are formed in a region formed between the point BX/2 in the +X direction and a point RLX. The absolute value |CR| of radius of curvature CR of the main body of each microlens 13a measured in the vicinity of optical axis 15 is greater than the absolute value |CRB| of radius of curvature CRB of boundary portion 13c of each microlens 13a of second lens plate 13. This configuration is the same in first lens plate 11.

Figure 7:
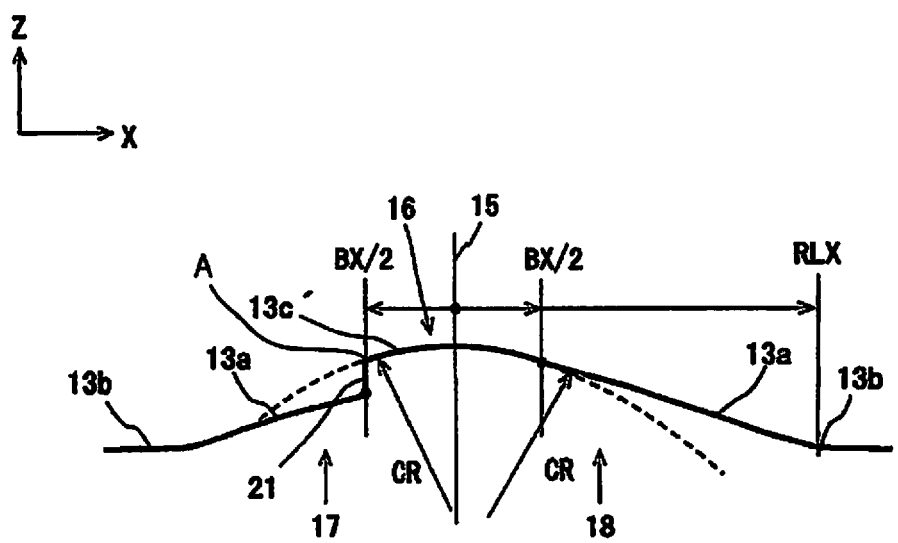
FIG. 7 is a cross-sectional view of a comparative example used in a description of FIG. 6.

Optical axes 15 of microlenses 13a of second lens plate 13 are located on center line CL (FIG. 5) between first lens row 17 and second lens row 18. Assume here that, as shown in FIG. 7 showing a comparative example, boundary portion 13c' has one radius of curvature, i.e., a radius of curvature CR of microlens 13a in a cross section taken along a plane corresponding to plane B-B of FIG. 5. In this case, step portion 21, having a flat surface parallel with the optical axis direction, is formed at a position (Y) where boundary portions 13c' of respective first and second lens rows 17 and 18 contact each other. More specifically, joint portion A where boundary line Z1 and boundary line Y meet each other has a level difference between boundary line Z1 and boundary line Y in the comparative example as shown in FIG. 7. Joint portion A' (not shown in FIG. 7) where boundary line Z2 and boundary line Y meet each other has a level difference between boundary line Z2 and boundary line Y in the comparative example. In this embodiment, as shown in FIG. 6, boundary portion 13c of each microlens 13a has a radius of curvature CRB, the absolute value of which is smaller than the absolute value |CR| of radius of curvature CR such that the optical axis of each microlens 13a is provided in boundary portion 13c of microlens 13a outside of the main body of microlens 13a. Thereby, boundary portion 13c has a curved surface having no step 21 and hence no flat surface parallel with the optical axis direction at the position (A, A') where boundary portions 13c of respective first and second lens rows 17 and 18 contact each other. This configuration is the same as that in first microlenses 11a of first lens plate 11.

Microlenses 11a of first lens plate 11 and microlenses 13a of second lens plate 13 each have a curved surface which is formed of a part of a rotationally symmetric high order aspheric surface expressed by Numerical Expression 1, below. In FIGS. 4 and 5, $r=(X^2+Y^2)^{1/2}$, and a function $Z(r)$ indicates a position on the curved surface (a position Z in the Z-axis direction) at the coordinate position (X, Y) on the X-Y plane, where an intersecting point between the curved surface of each microlens 11a of first lens plate 11 or each microlens 13a of second lens plate 13 and optical axis 14 or 15 of the microlens is defined as the origin in XYZ coordinates of the microlens. The variable r indicates a rotating system of coordinates in the radial direction. Note that the X, Y, and Z axes of the XYZ coordinates mentioned here are set in accordance with the XYZ directions in the drawings.

In the following Numerical Expression 1, $CR_{nm}$ indicates a radius of curvature in the vicinity of optical axis 15 (14), $A_{nm}$ indicates a fourth-order aspheric coefficient, $B_{nm}$ indicates a sixth-order aspheric coefficient, and n and m each take a value of 1 or 2. n=1 indicates microlens 11a of first lens plate 11, n=2 indicates microlens 13a of second lens plate 13, m=1 indicates a lens surface on object plane OP side, and m=2 indicates a lens surface on image plane IP side.

$$Z(r) = \frac{\frac{r^2}{CR_{nm}}}{1+\sqrt{1-\left(\frac{r}{CR_{nm}}\right)^2}} + A_{nm}r^4 + B_{nm}r^6$$ [Numerical Expression 1]

Figure 8:
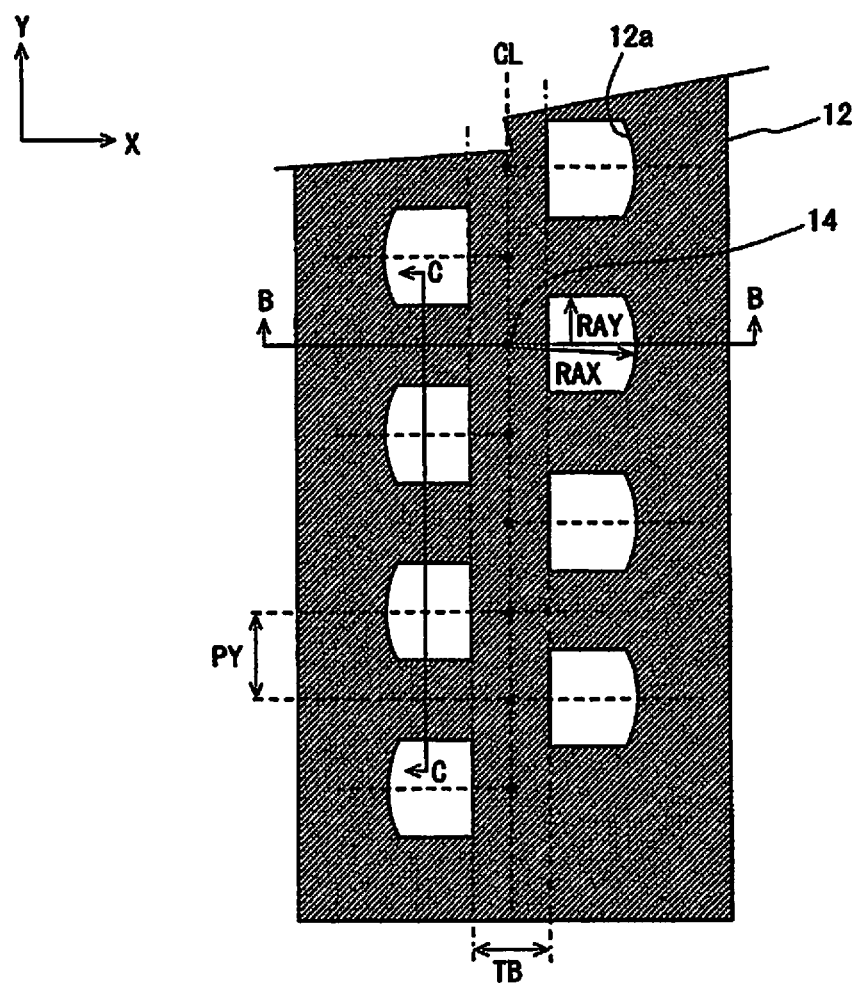
FIG. 8 is a plan view showing a main part of the light shield plate shown in FIG. 4.

FIG. 8 is a plan view showing a main part of light shield plate 12 shown in FIG. 4.

As shown in FIG. 8, light shield plate 12 has apertures 12a staggered in two rows. The two rows of apertures 12a are arranged with their center line coinciding with center line CL in the width direction of lens unit 1 (the X direction). An interval between apertures 12a in the microlens arrangement direction (the Y direction) is equal to the interval between microlenses 11a (13a) of first lens plate 11 (second lens plate 13) in this direction. Apertures 12a are arranged facing these microlenses respectively. In other words, apertures 12a are formed in such a way that microlenses 11a and 13a and aperture 12a, facing one another, are located at the same coordinate position on X-Y plane.

Each aperture 12a has such a shape that a circle of radius RAX, having a center at a position of corresponding optical axis 14 (15), is cut with a straight line parallel to the width direction of lens unit 1 and away from the center of the circle by a distance RAY, and with a straight line parallel with the microlens arrangement direction and away from the center of the circle by a distance of one-half the width TB of lens unit 1, or TB/2, where RAX>RAY. In addition, apertures 12a are arranged in such a way that a center position of each aperture 12a in the microlens arrangement direction (the Y direction) matches corresponding optical axis 14 (15), which is located on center line CL in the width direction of lens unit 1 (the X direction). Since optical axes 14 (15) do not overlap apertures 12a, light rays coming from an object along optical axes 14 are blocked by light shield plate 12.

Width TB, in the width direction of lens unit 1 (the X direction), of an interval between apertures 12a staggered in two rows is greater than width BX, in the width direction of lens unit 1 (the X direction), of each boundary portion 11c of first lens plate 11 and of each boundary portion 13c of second lens plate 13 (FIG. 9), i.e., TB>BX. Light shield plate 12 is made of a material capable of blocking light rays from the light emission unit. In this embodiment, light shield plate 12 is made by injection molding from polycarbonate.

Figure 9:
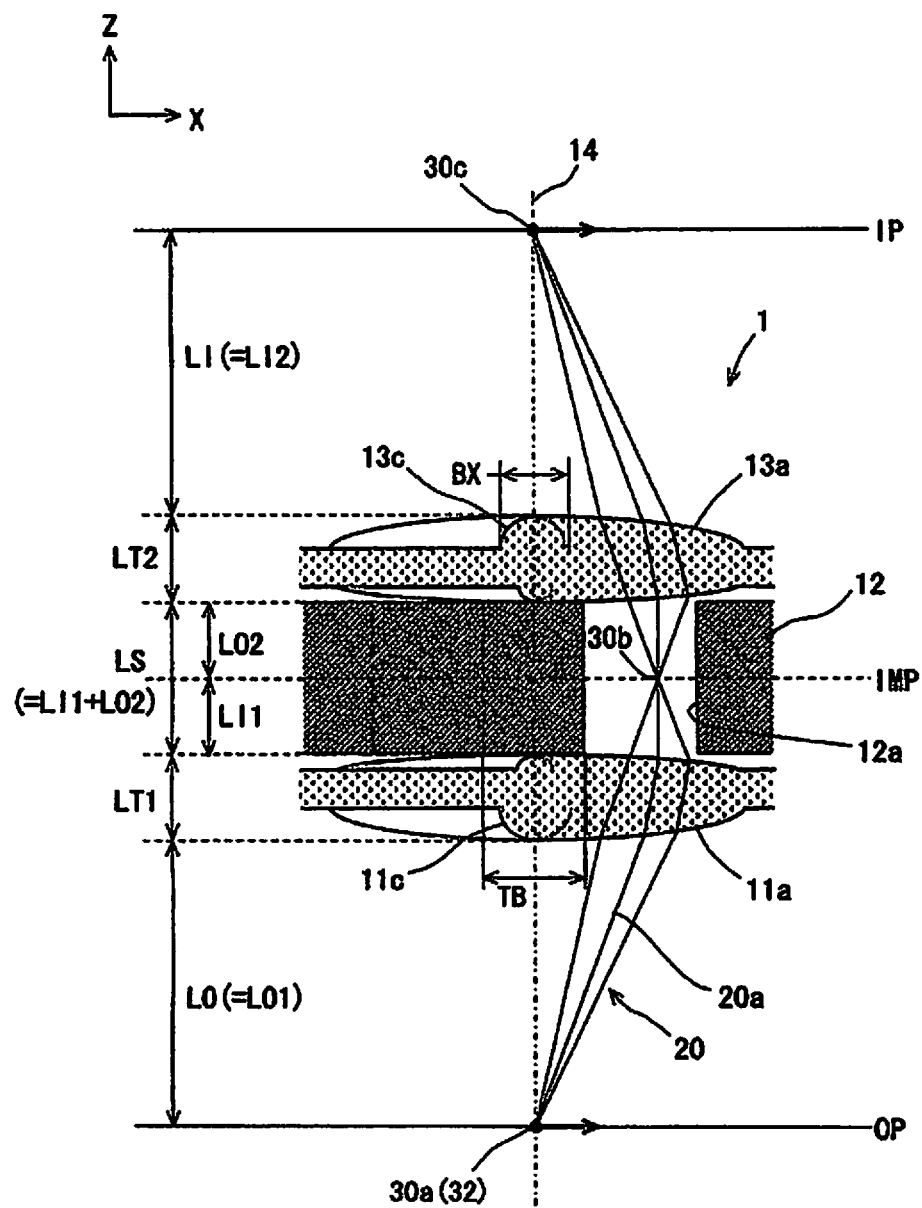
FIG. 9 is a diagram for describing the relationship among the lens unit, object plane OP, and image plane IP, and corresponds to a cross-sectional view of the lens unit taken along a position which includes the B-B cross section of the second lens plate including the optical axis (FIG. 5) and the B-B cross section of the light shield plate including the optical axis (FIG. 8).

Lens unit 1 is further described as follows. FIG. 9 is a diagram for describing the relationship among lens unit 1, object plane OP, and image plane IP. FIG. 9 corresponds to a cross-sectional view of lens unit 1 taken along a position which includes the B-B cross section of second lens plate 13 including optical axis 15 (FIG. 5) and the B-B cross section of light shield plate 12 including optical axis 14 (FIG. 8).

LED array 32 serving as object 30a is disposed on object plane OP at a position intersecting an extrapolated line from center line CL in the width direction of lens unit 1. Microlenses 11a of first lens plate 11 are disposed at a position distance LO away from object plane OP. Further, microlenses 13a of second lens plate 13 are disposed facing respective microlenses 11a of first lens plate 11 at a distance LS in such a way that their optical axes match each other. Image plane IP of lens unit 1 is located at a position distance LI away from microlenses 13a of second lens plate 13 in the optical axis 14 direction. Each microlens 11a of first lens plate 11 has a thickness LT1 whereas each microlens 13a of second lens plate 13 has a thickness LT2.

Microlens 11a of first lens plate 11 forms intermediate image 30b as an image of object 30a existing at a position distance LO1 away from the surface of microlens 11a in the optical axis 14 direction. Intermediate image 30b is formed on intermediate image plane IMP located at a distance LI1 away from the surface of microlens 11a in the optical axis 14 direction. Microlens 13a of second lens plate 13 forms image 30c of intermediate image 30b, which exists at a position distance LO2 away from the surface of microlens 13a, on image plane IP which is located at a distance LI2 away from the surface of microlens 13a in the optical axis 14 direction. Image 30c thus formed is a same-size erect image of object 30a.

In this embodiment, distance LO from object plane OP of lens unit 1 to microlens 11a of first lens plate 11 is set equal to distance LO1; interval LS between microlens 11a of first lens plate 11 and microlens 13a of second lens plate 13 is set at LI1+LO2; and distance LI from microlens 13a of second lens plate 13 to image plane IP of lens unit 1 is set equal to distance LI2.

Microlens 11a of first lens plate 11 and microlens 13a of second lens plate 13 may have the same configuration. In this case, microlens 11a of first lens plate 11 and microlens 13a of second lens plate 13 both have a thickness LT1. Microlenses 11a and 13a are arranged facing each other in such a way that a curved surface of microlens 11a of first lens plate 11 on the object plane side has the same shape as a curved surface of microlens 13a of second lens plate 13 on the image plane side. Distance LO1 is set equal to distance LI2; distance LO is set equal to distance LI; distance LO2 is set equal to distance LI1; and interval LS between microlens 11a of first lens plate 11 and microlens 13a of second lens plate 13 is set at 2×LI1.

The curved surfaces of microlens 11a of first lens plate 11 and of microlens 13a of second lens plate 13a on the light shield plate 12 side are defined by Numerical Expression 1 described above. In the same way as the curved surface of each of the microlenses on the object plane side and on the image plane side, the curved surface in the boundary portion of each microlens 13a on the light shield plate 12 side have no step, parallel with the optical axis direction, at the position (Y) where the boundary portions of the respective microlenses in first and second lens rows 17 and 18 (FIG. 5) contact each other.

First of all, the operation of color printer 90 having the above configuration is described with reference to FIG. 1.

The surface of photosensitive drum 41 of each of toner image formation units 92 to 95 is electrically charged by corresponding charging roller 42 to which a certain voltage is applied from the unillustrated power supply. Then, when the charged surface of photosensitive drum 41 approaches LED head 3 along with the rotation of photosensitive drum 41 in the arrow direction, the charged surface is exposed to LED head 3 whereby an electrostatic latent image is formed thereon. The electrostatic latent image thus formed is developed by developer 52, and thereby a toner image is formed on the surface of photosensitive drum 41.

Meanwhile, recording paper 91 set in paper cassette 60 is taken out of paper cassette 60 by feed roller 61, and is then transported to a position near transfer roller 80 and transfer belt 81 by transport rollers 62 and 63. When the toner image on the surface of photosensitive drum 41 obtained by the development approaches transfer roller 80 and transfer belt 81 along with the rotation of photosensitive drum 41, the toner image on the surface of photosensitive drum 41 is transferred onto recording paper 91 by means of transfer belt 81 and transfer roller 80 to which the certain voltage is applied from the unillustrated power supply. Toner image formation units 92 to 95 carry out such transfer of the toner image on recording paper 91 so that the toner images of yellow (Y), magenta (M), cyan (C), and black (K) formed by them overlap one after another.

Subsequently, recording paper 91 having the toner images of the respective colors formed on its surface is transported to fixation unit 53 along with the rotation of transfer belt 81. Fixation unit 53 melts the toner image on recording paper 91 by applying pressure and heat to fix the toner image onto the surface of recording paper 91. Recording paper 91 subjected to the fixation processing is then discharged to discharge portion 66 by transport rollers 64 and discharge rollers 65. Thus, the image formation operation is completed.

Next, the operation of LED head 3 is described with reference to FIGS. 3 and 4. When the unillustrated controller of color printer 90 sends a control signal to the exposure device based on image data, LED elements 34 of LED array 32 selectively emit light under the control of driver IC 35. The light rays from LED array 32 enter lens unit 1, whereby an image is formed on the surface of photosensitive drum 41.

The operation of lens unit 1 carried out at this time is further described with reference to FIG. 9.

By means of microlens 11a of first lens plate 11, intermediate image 30b is formed as an inverted reduced image (image) of object 30a (equivalent to LED array 32) on intermediate image plane IMP. Then, by means of microlens 13a of second lens plate 13, image 30c is formed as an inverted enlarged image of intermediate image 30b on image plane IP. Image 30c thus formed is a same-size erect image of object 30a.

Hence, a direction indicated by an arrow on object plane OP (the +X direction) is equivalent to a direction indicated by an arrow on image plane IP (the +X direction). In addition, chief rays 20a from points on the object plane are parallel with optical axes 14 and 15, i.e., telecentric in a region between microlens 11a of first lens plate 11 and microlens 13a of second lens plate 13. Among light rays 20 from object 30a, light rays not used for image formation are blocked by light shield plate 12.

In the case where microlens 11a of first lens plate 11 and microlens 13a of second lens plate 13 have the same configuration, in the same way as the above case, intermediate image 30b is formed as an inverted reduced image of object 30a on intermediate image plane IMP. By means of microlens 13a of second lens plate 13, image 30c is formed as an inverted enlarged image of intermediate image 30b on image plane IP. Image 30c thus formed is a same-size erect image of object 30a. A direction indicated by an arrow on object plane OP (the +X direction) is equal to a direction indicated by an arrow on image plane IP (the +X direction). Chief rays 20a from points on the object plane are parallel with optical axes 14 and 15, i.e., are telecentric in a region between microlens 11a of first lens plate 11 and microlens 13a of second lens plate 13. Among light rays 20 from object 30a, light rays not used for image formation are blocked by light shield plate 12. As described above, in the case where microlens 11a of first lens plate 11 and microlens 13a of second lens plate 13 have the same configuration, in the same way as the above case, image 30c of object 30a thus formed is a same-size erect image of object 30a.

In this embodiment, boundary portions 11c and 13c each have the curved surface without any step having a flat surface extending in the optical axis 14 direction. This configuration never causes any stray light which otherwise would incur a reduction in imaging contrast. Thus, a high-contrast image can be formed. In addition, as described with reference to FIG. 6, the absolute value |CRB| of radius of curvature CRB of the curved surface of each of boundary portions 11c and 13c as defined by two adjacent boundaries Y is set smaller than the absolute value |CR| of radius of curvature CR of the curved surface of the main body of each of microlenses 11a and 13a measured in the vicinity of the optical axis. This configuration makes it possible to reduce the dimension of each of boundary portions 11c and 13c in the lens unit width direction (equivalent to width BX of boundary region 16) and to increase the dimension of each of the main body of microlenses 11a and 13a, excluding their boundary portions in the lens unit width direction (the X direction), by the amount of the reduction. Thereby, microlenses 11a and 13a can receive more light rays from the object, so that a bright image can be obtained.

The displacement of the optical axis of each lens matches the displacement of a position at which an image is formed. For this reason, the displacement of the optical axis of each lens from center line 14 is preferably kept at about a half of a pitch at which pixels of an object (LED elements 34 of LED array 32), from which an image is to be formed by lens unit 1, are arranged. Specifically, when the object has a resolution of 1200 dpi (i.e., 1200 pixels are arranged per inch), pixels are arranged at a pitch of 0.021 mm. Hence, the displacement of the optical axis of each lens from the straight line is preferably set equal to or smaller than 0.0105 mm.

In general, when an angle between the optical axis of each lens and a direction in which an object is located from the lens is θ, the brightness of an image of the object formed by the lens is proportional to $COS^4 \theta$ (cosine fourth law). Accordingly, an image formed by the lens is the brightest when the object is located on the optical axis of the lens. The configuration of placing the linear object (LED array) on the optical axes of multiple lenses is achieved by arranging the lenses linearly in a row in such a way that the lenses face the object. However, if a lens array having lenses arranged in a single row is employed, an area in the vicinity of the optical axis of each lens is bright and an area in the vicinity of the boundary between two adjacent lenses is dark. In this way, cyclic changes in the amount of light according to the lens arrangement interval are large.

Even when the lens array of the single lens row is employed, the changes in the amount of light according to the lens arrangement interval can be reduced as the lens arrangement interval is reduced. However, the reduction of the lens arrangement interval makes it difficult to form a lens array and a light shield member, and increases the accuracy in combining these two parts. To avoid this, the configuration in this embodiment is employed. More specifically, lenses are arranged in two rows like first and second lens rows 17 and 18 shown in FIG. 5 in which microlenses 11*a* of first lens plate 11 are arranged in such a way that their optical axes are arranged in a row. Thereby, a bright image can be formed and the cyclic changes in the amount of light can be reduced.

In addition, the boundary between two lenses adjacent to each other in the same row (for example, microlenses 13*a* of second lens plate 13 shown in FIG. 5) is linear. Thereby, the surfaces of the two lenses adjacent to each other in the same row have the same level and there is no step between these lenses that extends in the optical axis direction. This makes it possible to form the lens surface precisely, and to prevent generation of stray light which is generated by diffuse reflection of light rays at the boundary between the two lenses adjacent to each other in the same row and which causes a reduction in imaging contrast.

Figure 15A:
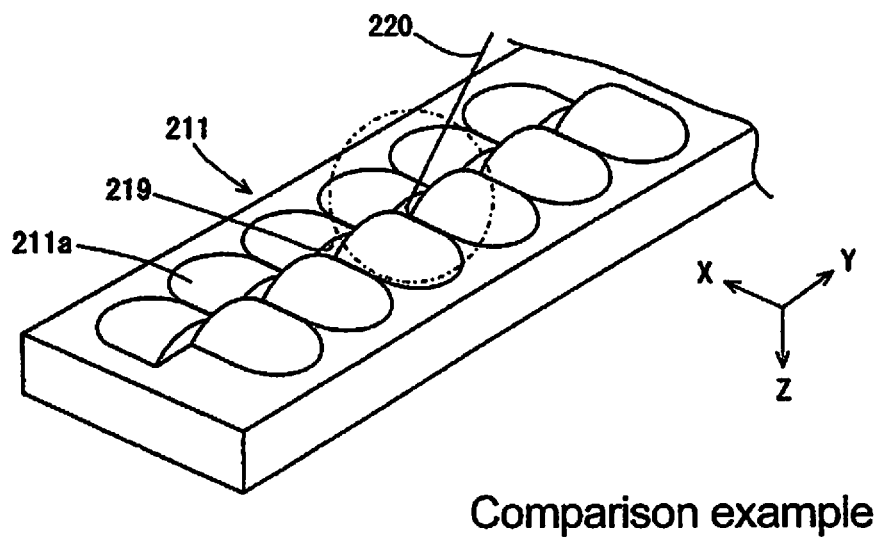
FIGS. 15A and 15B are external perspective views showing the configuration of a lens plate cited as a comparative example.
Figure 15B:
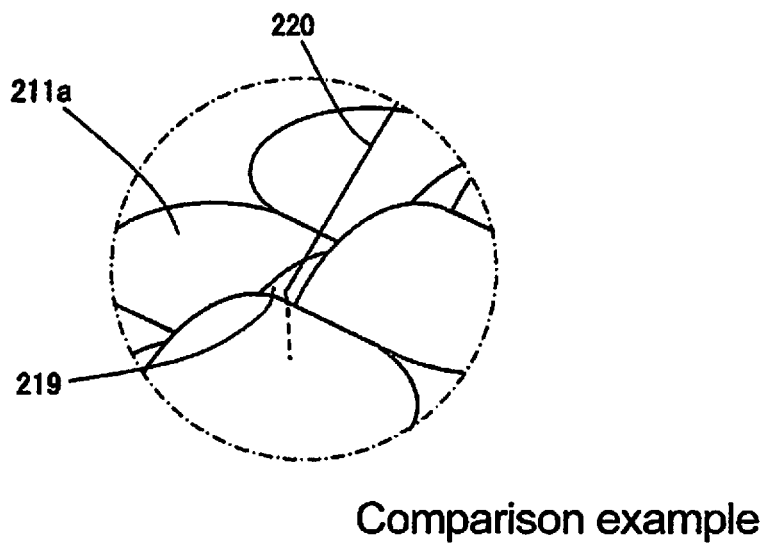
Figure 16:
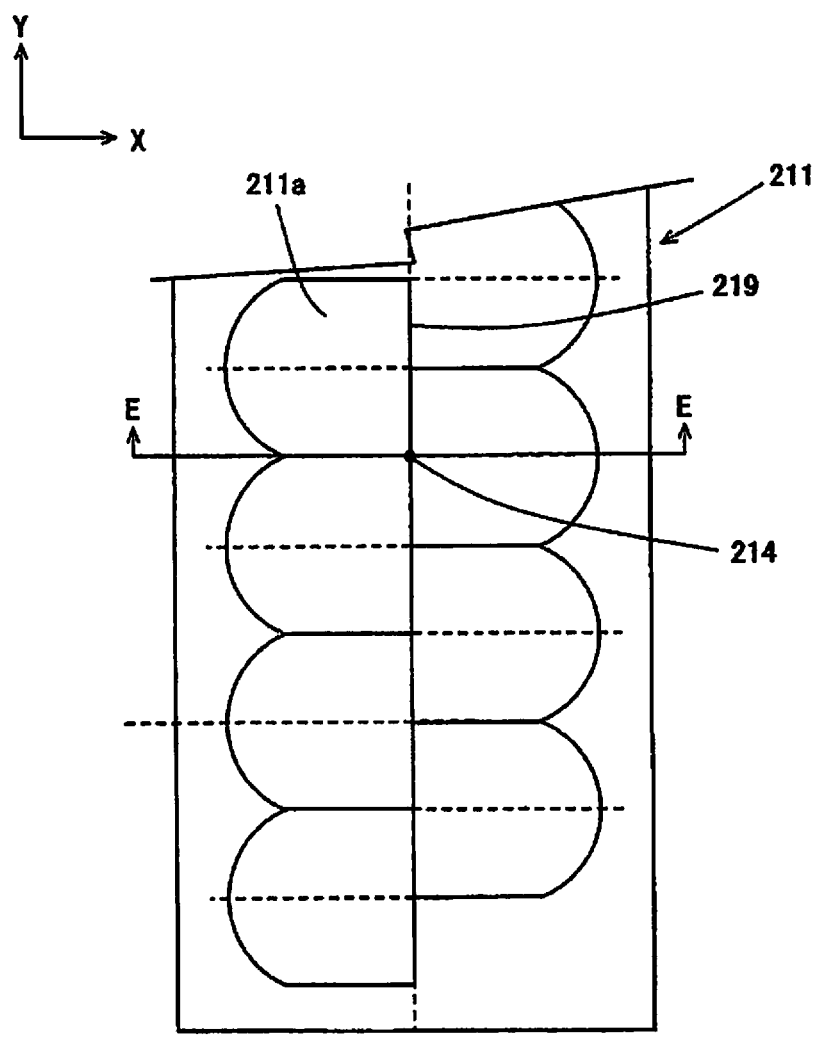
FIG. 16 is a plan view of the lens plate shown in FIGS. 15A and 15B.
Figure 17:
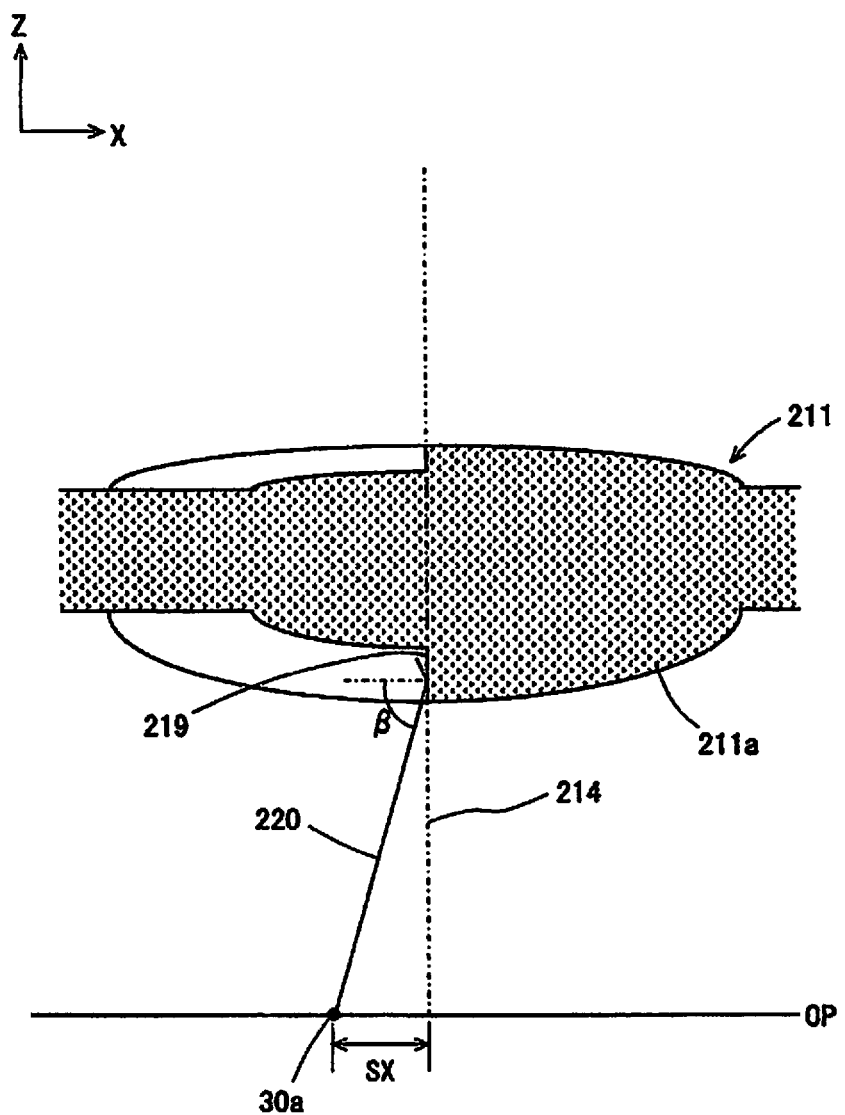
FIG. 17 is a cross-sectional view of the lens plate taken along line E-E of FIG. 16.

With reference to lens plate 211 shown in FIGS. 15, 16, and 17 as a comparative example, a description is given of stray light generated when a step in the optical axis direction exists between the surfaces of lenses of the respective adjacent lens rows. Note that FIG. 15B is a partially enlarged view of a part of FIG. 15A which is circled by a chain line.

Microlenses 211*a* are arranged on lens plate 211. In the same way as second lens plate 13 of this embodiment shown in FIG. 5, for example, microlenses 211*a* are arranged in two rows and their optical axes 214 are arranged in a row. Step 219 is a step between the surfaces of lenses of the respective adjacent lens rows and has a flat surface parallel with optical axes 214. In this manner, lens plate 211 of the comparative example has the same shape as second lens plate 13 of this embodiment except that the step in the optical axis direction exists between the surfaces of the lenses of the respective adjacent lens rows and that no boundary region 16 is formed, unlike in second lens plate 13 of this embodiment shown in FIG. 5 for example.

FIG. 17 is a cross-sectional view of microlenses 211*a* taken along a plane orthogonal to the arrangement direction of microlenses 211*a*, and is a cross-sectional view of microlenses 211*a* taken along line E-E of FIG. 16. When object 60*a* is located on object plane OP at a position displaced from optical axes 214 of the lenses by SX in the −X direction as shown in FIG. 17, stray light ray 220 enters step 219 of this lens plate 211 as shown in FIGS. 15 and 17. Because stray light ray 220 enters step 219 at a large incident angle β at this time, stray light ray 220 is totally reflected off step 219. Stray light ray 220 reflected off step 219 of lens plate 211 in this manner enters microlens 211*a*, and an image from stray light ray 220 is formed on a light reception surface by a lens surface of a lens plate on an image plane side. This leads to a reduction in imaging contrast. On the other hand, second lens plate 13 of this embodiment, for example, has no step having a level difference in the optical axis 15 direction as shown in FIG. 6, and thus never causes any stray light which incurs a reduction in imaging contrast. Thereby, a high-contrast image can be formed.

Note that lens plate 11 of this embodiment and lens plate 211 of the comparative example are long members; hence, they warp or bend in the X direction as shown in FIGS. 5 and 16, and therefore displacement SX of about 0.05 mm exists between optical axis 14 and object 30*a*.

As described above, according to the lens unit of this embodiment, no step is formed at the boundary between two adjacent microlenses. This makes it possible to prevent the contrast of an image formed by means of the microlenses from being reduced due to stray light, and thereby to increase the resolution of the image formation apparatus.

Note that, in the first embodiment, optical axes 14 of all microlenses 11*a* of first lens plate 11 are located on virtual line CL, and optical axes 15 of all microlenses 13*a* of second lens plate 13 are located on virtual line CL; however, not all optical axes 14 (15) of microlenses 11*a* (13*a*) have to be located exactly on virtual line CL (CL). In this case, it is preferable that a distance between a straight line which connects the optical axes of two adjacent microlenses 11*a* (13*a*) in first lens row 17 and the optical axis of microlens 11*a* (13*a*) of second lens row 18 which is located between these two microlenses 11*a* (13*a*) be equal to or smaller than 30% of radius RLX of each microlens.

Further, it is preferable that a distance between one end of lens plate 11 (13) and optical axes 14 (15) of microlenses 11*a* (13*a*) fall within 35% to 65% of the width of lens plate 11 (13) in the width direction of lens plate 11 (13) (the X direction).

Furthermore, it is preferable that all microlenses 11*a* (13*a*) forming lens plate 11 (13) satisfy the above relationship. However, an effect of a certain degree can be achieved if 70% or more of all microlenses 11*a* (13*a*) forming lens plate 11 (13) satisfy the above relationship.

Second Embodiment

Figure 10:
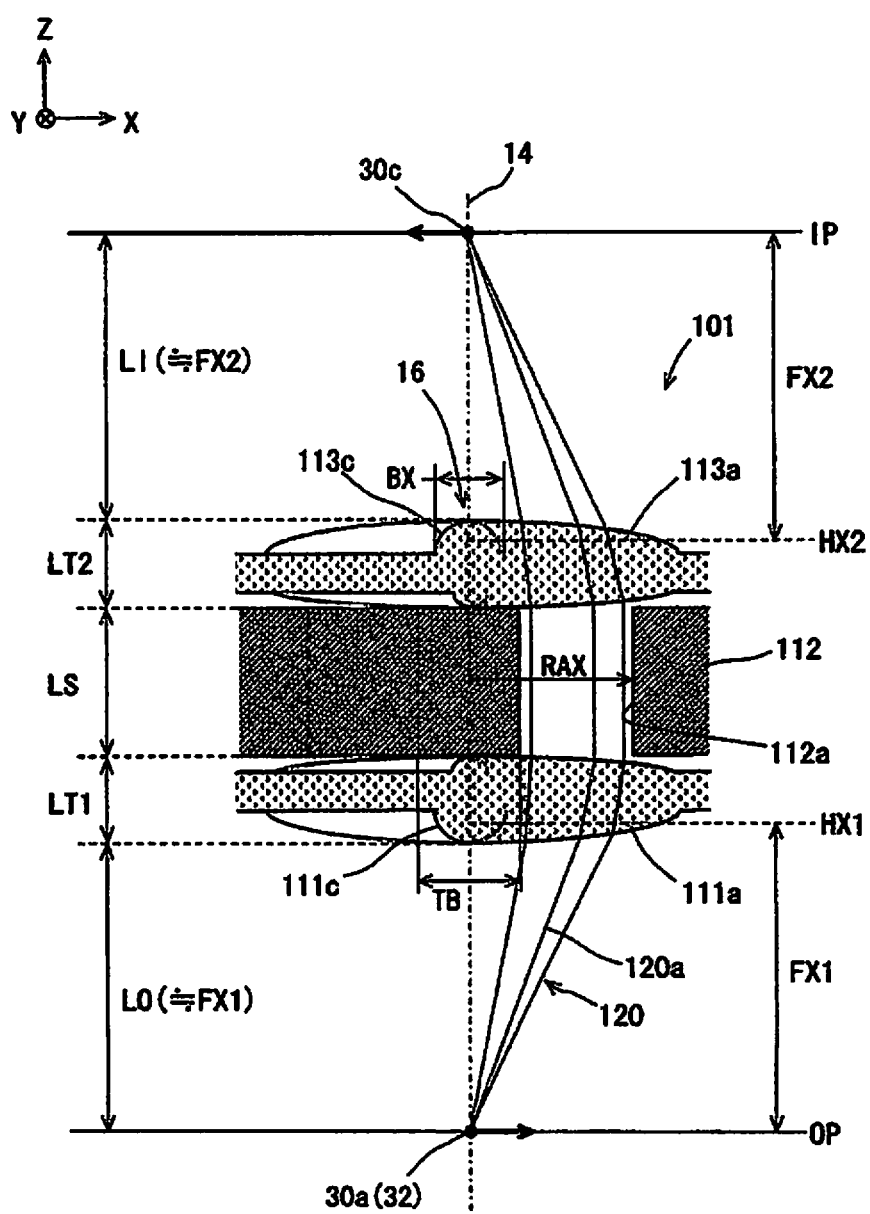
FIG. 10 is a view for describing the relationship among the lens unit according to a second embodiment of the invention, object plane OP, and image plane IP, and corresponds to a cross-sectional view of the lens unit of the first embodiment taken along a position which corresponds to the B-B cross section of FIG. 5 and the B-B cross section of FIG. 8.

FIG. 10 is a view for describing the relationship among lens unit 101 according to the second embodiment of the invention, object plane OP, and image plane IP. FIG. 10 corresponds to a cross-sectional view of lens unit 1 of the first embodiment taken along a position which corresponds to the B-B cross section of FIG. 5 and the B-B cross section of FIG. 8.

An image formation apparatus employing this lens unit 101 is mainly different from the image formation apparatus of the first embodiment shown in FIG. 1 in that microlenses of lens unit 101 each have a shape different from lens unit 1. Thus, the image formation apparatus with this lens unit 101 is described while focusing on a difference from color printer 90 of the first embodiment (FIG. 1). To this end, parts of the image formation apparatus of this embodiment which are the same as those of color printer 90 are given the same reference numeral, no drawings therefor are provided and description thereof is omitted. Note that the main configuration of the image formation apparatus of this embodiment is the same as the main configuration of color printer 90 of the first embodiment shown in FIG. 1 except for the shape of lens unit 101; hence, the drawings used in the first embodiment are referred to as needed.

As shown in FIG. 10, LED array 32 serving as object 30$a$ is disposed on object plane OP at a position intersecting an extrapolated line from center line CL (including optical axes 14) in the width direction of lens unit 101. Microlenses 111$a$ of a first lens plate are disposed at a position away from object plane OP by a distance LO. Further, microlenses 113$a$ of a second lens plate are disposed facing respective microlenses 111$a$ of the first lens plate with a distance LS in such a way that their optical axes match each other. Image plane IP of lens unit 101 is located at a position away from microlenses 113$a$ of the second lens plate by a distance LI in the optical axis 14 direction. Each microlens 111$a$ of the first lens plate has a thickness LT1, whereas each microlens 113$a$ of the second lens plate has a thickness LT2. Apertures 112$a$ serving as diaphragms are formed in light shield plate 112.

Here, a plane parallel with a plane including optical axes 14 and positions where the optical axes are arranged, i.e., in a plane parallel with the Y-Z plane (a plane perpendicular to the X direction), is defined as a meridional plane. A plane parallel with a plane including optical axis 14 and orthogonal to the meridional plane, i.e., a plane parallel with the X-Z plane (a plane perpendicular to the Y direction), is defined as a sagittal plane. A focal spot, a principal plane, and a focal distance of a bundle of parallel rays on the sagittal plane are defined as a sagittal focal point, a sagittal principal plane, and a sagittal focal distance, respectively.

A distance from sagittal principal plane HX1 of each microlens 111$a$ of the first lens plate to object plane OP is set equal to sagittal focal distance FX1 of microlens 111$a$ of the first lens plate, and object distance LO and FX1 are set almost equal to each other. A distance from sagittal principal plane HX2 of each microlens 113$a$ of the second lens plate to image plane IP is set equal to sagittal focal distance FX2 of microlens 113$a$ of the second lens plate, and image distance LI and FX2 are set almost equal to each other. Boundary portions 111$c$ are formed in the vicinity of the center of microlenses 111$a$ of the first lens plate in the lens unit width direction (X direction), whereas boundary portions 113$c$ are formed in the vicinity of the center of microlenses 113$a$ of the second lens plate in the lens unit width direction.

As in the case of the first embodiment described above, boundary portions 111$c$ (113$c$) are formed to continue from one microlens 111$a$ of the first lens plate (microlens 113$a$ of the second lens plate) to the adjacent microlenses and are disposed in a boundary region of width BX. These portions have no step portion, parallel with the optical axis direction, at the position where the boundary portions of the respective microlenses in first and second lens rows 17 and 18 (FIG. 5) contact (join) each other.

Figure 11:
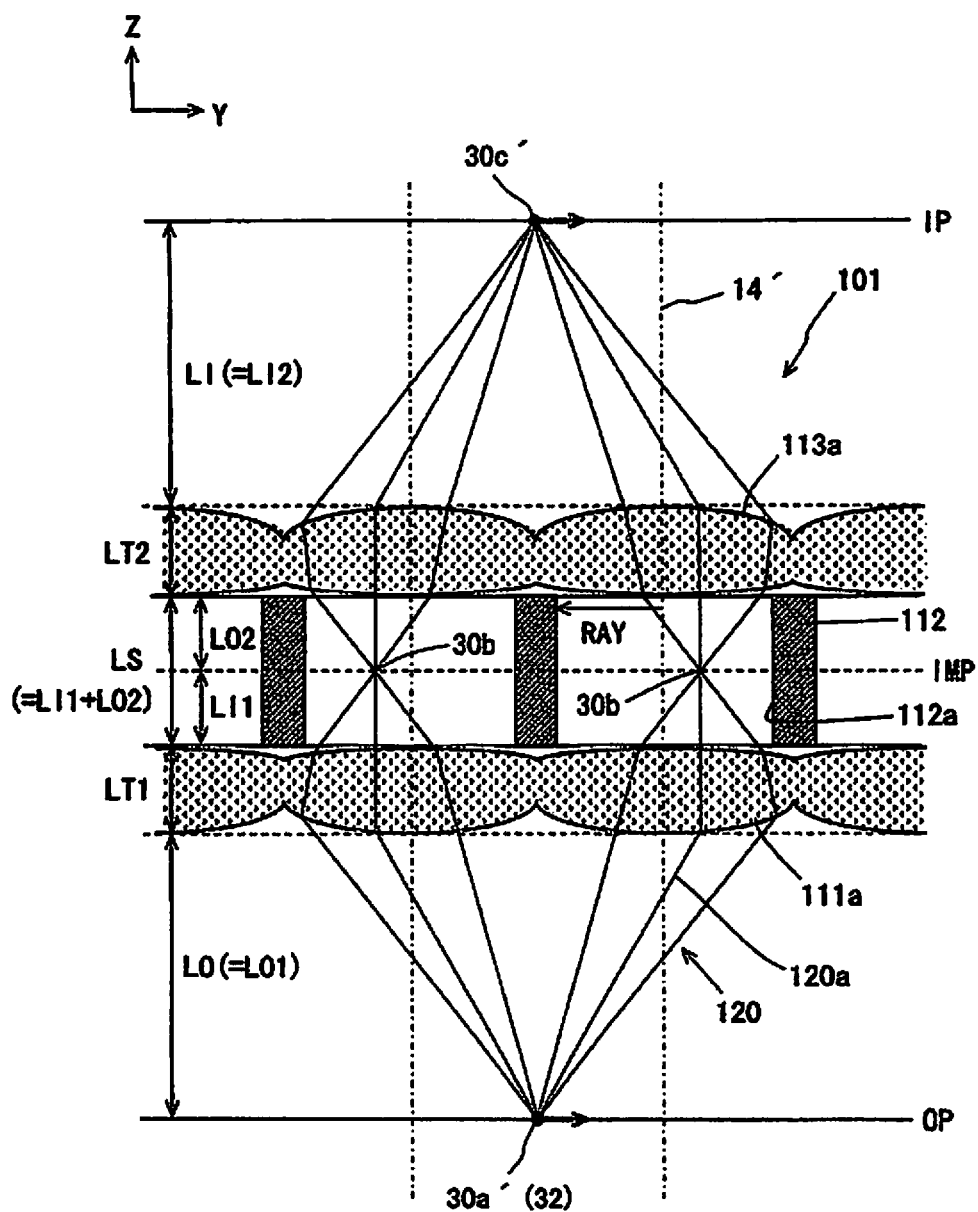
FIG. 11 is a cross-sectional view of the lens unit of the second embodiment, object plane OP, and image plane IP, and corresponds to a cross-sectional view of the lens unit of the first embodiment taken along a meridional plane at a position corresponding to the C-C cross section of FIG. 5 and the C-C cross section of FIG. 8.

FIG. 11 is a cross-sectional view of lens unit 101, object plane OP, and image plane IP, and corresponds to a cross-sectional view of lens unit 1 of the first embodiment taken along the meridional plane at a position corresponding to the C-C cross section of FIG. 5 and the C-C cross section of FIG. 8. Microlenses 111$a$ of the first lens plate and microlenses 113$a$ of the second lens plate are arranged in the horizontal direction in FIG. 11 (the Y direction) and arranged in such a way that their optical axes 14 extend in the vertical direction in FIG. 11 (the Z direction).

Note that light ray components on the meridional plane are defined as meridional rays. Optical axes 14, object 30$a$, and image 30$c$ located on a plane different from the cross section shown in FIG. 11 (i.e., a plane including optical axes 14) are shown in FIG. 11 as optical axes 14', object 30$a$', and image 30$c$' for the purpose of convenience, while being differentiated from those of FIG. 11 by the addition of dashes.

In FIG. 11, microlenses 111$a$ of the first lens plate each have a thickness LT1, and form intermediate image 30$b$ as an image from the meridional rays which come from object 30$a$' located at a position distance LO1 away from the surface of each microlens 111$a$ in the optical axis 14' direction. Intermediate image 30$b$ is formed on intermediate image plane IMP located at a distance LI1 away from the surface of microlens 111$a$ in the optical axis direction. Microlenses 113$a$ of the second lens plate each have a thickness LT2, and form image 30$c$' of the meridional rays from intermediate image 30$b$, which exists at a position distance LO2 away from the surface of each microlens 113$a$, on image plane IP which is located at a distance LI2 away from the surface of microlens 113$a$ in the optical axis 14' direction.

In this embodiment, distance LO from object plane OP of lens unit 101 to microlens 111$a$ of the first lens plate is set equal to distance L01; interval LS between microlens 111$a$ of the first lens plate and microlens 113$a$ of the second lens plate is set at LI1+LO2; and distance LI from microlens 113$a$ of the second lens plate to image plane IP of lens unit 101 is set equal to distance LI2.

Microlens 11$a$ of the first lens plate and microlens 113$a$ of the second lens plate may have the same configuration. In this case, microlens 111$a$ of the first lens plate and microlens 113$a$ of the second lens plate both have a thickness LT1. Microlenses 111$a$ and 113$a$ are arranged facing each other in such a way that a curved surface of microlens 111$a$ of the first lens plate on the object plane side has the same shape as a curved surface of microlens 113$a$ of the second lens plate on the image plane side. Distance LO1 is set equal to distance LI2. Distance LO is set equal to distance LI; distance LO2 is set equal to distance LI1, and interval LS between microlens 111$a$ of the first lens plate and microlens 113$a$ of the second lens plate is set at 2×LI1.

The shapes of the light incident surface and light output surface of microlens 111$a$ of the first lens plate (microlens 113$a$ of the second lens plate) of this embodiment in a cross section taken along the meridional plane are different from those in a cross section taken along the sagittal plane. In addition, the radii of curvature of the light incident surface and light output surface of microlens 111$a$ of the first lens plate (microlens 113$a$ of the second lens plate) in the cross section taken along the meridional plane are smaller than those in the cross section taken along the sagittal plane.

Each of the curved surfaces of microlens 111$a$ of the first lens plate and microlens 113$a$ of the second lens plate may be formed of a part of a XY polynomial surface expressed by Numerical Expression 2, below. Variables X and Y in Numerical Expression 2 indicate the coordinate position on the X-Y plane. A function Z (X, Y) indicates a position on the curved surface (a position Z in the Z-axis direction) at the coordinate position (X, Y) on the X-Y plane, where an intersecting point between the curved surface of each microlens 111$a$ of the first lens plate or each microlens 113$a$ of the second lens plate and optical axis 14 or 15 of the microlens is defined as the origin in XYZ coordinates of the microlens. Note that the X, Y, and Z axes in the XYZ coordinates mentioned here are set in accordance with the X direction (sagittal direction), the Y direction (meridional direction), and the Z direction (optical axis direction) in the drawings.

In addition, CR indicates a radius of curvature, K indicates the conic constant, $CP_{kl}$ indicates a coefficient in the polynomial, and k and l indicate power exponents of X and Y and are positive integers.

$$Z(X, Y) = \frac{\frac{X^2 + Y^2}{CR}}{1 + \sqrt{1 - (1 + K)\frac{X^2 + Y^2}{CR^2}}} + \sum CP_{k,l} X^k Y^l \qquad \text{[Numerical Expression 2]}$$

Further, the light incident surface and light output surface of each microlens are plane-symmetric with respect to the meridional plane including the optical axis of the microlens, and are also plane-symmetric with respect to the sagittal plane including the optical axis. Here, the power exponents k and l in [Numerical Expression 2] are even numbers.

The operation of lens unit 101 having the above configuration is described with reference to FIG. 10. Note that light ray components on the sagittal plane are defined as sagittal rays.

The sagittal rays coming from LED array 32 as object 30a enter microlenses 111a of the first lens plate. The sagittal rays are then formed into parallel rays by means of microlenses 111a of the first lens plate and are transmitted through apertures 112a of light shield plate 112. To put it differently, microlenses 111a of the first lens plate each act as a collimator lens on the sagittal plane, and the sagittal rays from object 30a are parallel rays in a region between microlenses 111a of the first lens plate and microlenses 113a of the second lens plate. The light rays are then focused by microlenses 113a of the second lens plate to form image 30c. Image 30c thus formed is an inverted image of object 30a. Hence, a direction indicated by an arrow marked on object 30a on object plane OP (the +X direction) is equivalent to a direction indicated by an arrow marked on image 30c on image plane IP (the −X direction). Among light rays 120 from object 30a, light rays not used for image formation are blocked by light shield plate 112.

The operation of lens unit 101 is further described with reference to FIG. 11. Among the light rays from LED array 32 as object 30a', the meridional rays enter microlenses 111a of the first lens plate. Microlenses 111a of the first lens plate focus the meridional rays to form intermediate image 30b on intermediate image plane IMP located at a distance LI1 away from the surface of each microlens 111a in the optical axis direction. Then, microlenses 113a of the second lens plate form image 30c' of object 30a' on image plane IP. Intermediate image 30b is an inverted reduced image of object 30a, and image 30c' thus formed by means of microlenses 113a of the second lens plate is an inverted enlarged image of intermediate image 30b. In addition, chief rays 120a of the meridional rays from points on the object plane are parallel with optical axis 14', i.e., telecentric in a region between microlenses 111a of the first lens plate and microlenses 113a of the second lens plate.

Image 30c' is a same-size erect image of object 30a' on the meridional plane. Hence, a direction indicated by an arrow marked on object 30a' on object plane OP (the +Y direction) is equivalent to a direction indicated by an arrow marked on image 30c' on image plane IP (the +Y direction). On the other hand, as described above, image 30c is an inverted image of object 30a on the sagittal plane (see FIG. 10). In other words, image 30c is a reflected image of object 30a, and they are reflective symmetric with respect to the meridional plane.

The sagittal focal distance of each microlens in lens unit 101 of this embodiment is larger than that in lens unit 1 of the first embodiment. In general, FN=F/Φ, where FN indicates the brightness of a lens, F indicates the focal distance of the lens, and Φ indicates the aperture (outer diameter) of the lens; that is, a lens with a larger focal distance gets a larger brightness FN. For this reason, lens unit 101 of this embodiment can form a brighter image than the lens unit of the first embodiment. Moreover, because the light rays outputted from microlenses 111a of the first lens plate are parallel rays, lens unit 101 of this embodiment can reduce aberration and distortion/blur of image 30c to a larger extent than the lens unit of the first embodiment.

Lens unit 1 of the first embodiment has such a configuration that, on both the sagittal and meridional planes, light rays are focused to form an intermediate image at a position on intermediate image plane IMP. The surface of each microlens 11a on the object plane side and the surface of each microlens 13a on the image plane side have a small radii of curvature. For this reason, in order for each microlens to increase radius RLX (see FIG. 5) and receive more light rays, it is necessary to increase the thickness of the microlens. Such increase of thickness tends to increase light rays which are transmitted from one microlens to another adjacent microlens, i.e., so-called crosstalk rays, and incurs a reduction in imaging contrast.

On the other hand, in lens unit 101 having the configuration of this embodiment, as shown in FIG. 10, microlenses 111a of the first lens plate each act as a collimator lens on the sagittal plane, and the sagittal rays from object 30a are parallel rays in the region between microlenses 111a of the first lens plate and microlenses 113a of the second lens plate. Accordingly, the surface of each microlens 111a on the object plane side and the surface of each microlens 113a on the image plane side have relatively large radii of curvature. For this reason, increasing radius RLX (see FIG. 5) of each microlens 111a of the first lens plate and of each microlens 113a of the second lens plate in order for the microlens to receive more light rays does not involve an increase in the thickness of the microlens. Thus, an increase of radius RLX does not increase crosstalk rays and does not incur a reduction in imaging contrast.

This embodiment succeeds in increasing the amount of light with the following configuration: radius RLX (FIG. 5) of each microlens 111a of the first lens plate and of each microlens 113a of the second lens plate is set at 1.5 mm; distance RLY (FIG. 5) between the center and one end portion of the microlens (in the arrangement direction) is set at 0.5 mm; and radius RLX is set three times as large as distance RLY.

As described above, the lens unit of this embodiment makes it possible to increase the dimension (RLX) in the direction orthogonal to the microlens arrangement direction (i.e., the lens unit width direction on the sagittal plane) and to form a brighter image.

Note that, although the first and second lens plates are disposed on both sides of the light shield plate in each of the lens units of the first and second embodiments described above, the invention is not limited to this. A lens unit having such a configuration that the lens plate is disposed on one side of a light shield plate can also obtain a similar effect.

Third Embodiment

Figure 12:
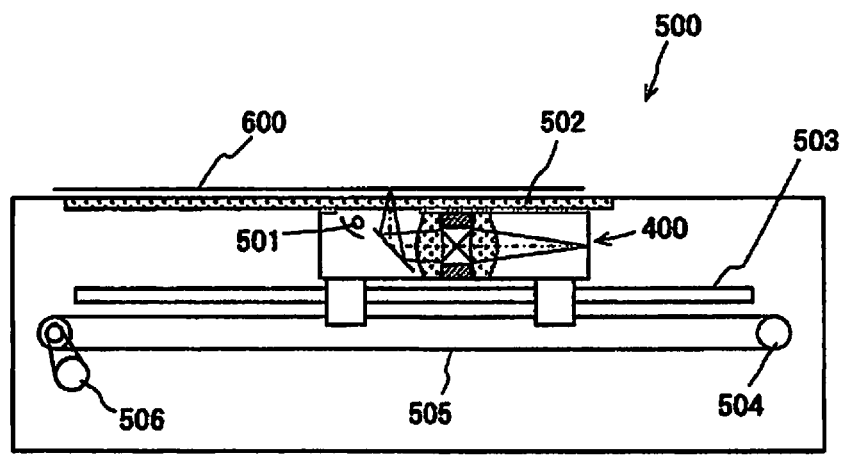
FIG. 12 is a main part configuration diagram showing the main part configuration of a scanner as an image reading apparatus according to a third embodiment of the invention.

FIG. 12 is a main part configuration diagram showing the main part configuration of a scanner as an image reading apparatus according to the third embodiment of the invention. Scanner 500 shown in FIG. 12 is configured to create electronic data of original document 600.

Reading head 400 is disposed in scanner 500 to be movable on rail 503. Reading head 400 is configured to capture light rays reflected by the surface of original document 600 placed on platen 502 and to convert the light rays into the electronic data. Platen 502 is made of a material which transmits visible light. Lamp 501 serving as a lighting device is disposed in such a way that light rays emitted from lamp 501 are reflected by the surface of original document 600 and captured by reading head 400. Drive belt 505 is wound around pulleys 504 and is connected at predetermined portions to reading head 400. Drive belt 505 is driven by motor 506 to move reading head 400 on rail 503.

Figure 13:
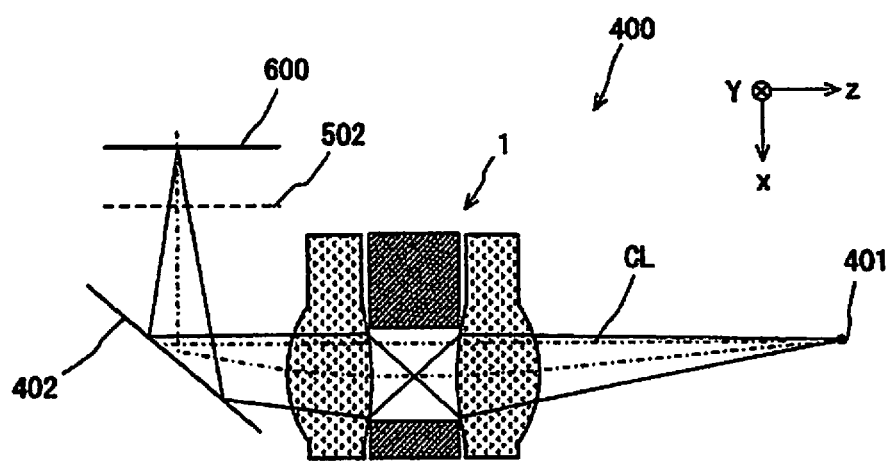
FIG. 13 is a configuration diagram showing the main configuration of the reading head of the third embodiment.

FIG. 13 is a configuration diagram showing the main configuration of reading head 400. As shown in FIG. 13, mirror 402 is configured to reflect the light rays, which are reflected by original document 600, so that the optical path of the light rays may be directed toward lens unit 1. Lens unit 1 is configured to form an image of original document 600. Line sensor 401 includes light reception elements arranged substantially linearly, and is configured to convert the image of original document 600 into electrical signals. Note that, in FIG. 13, the Z direction indicates an optical axis direction of lens unit 1, the X direction indicates the width direction of lens unit 1, and the Y direction indicates a direction orthogonal to these two directions. The same applies to FIG. 14 described later. In this embodiment, the light reception elements of line sensor 401 are arranged in the Y direction.

Figure 14:
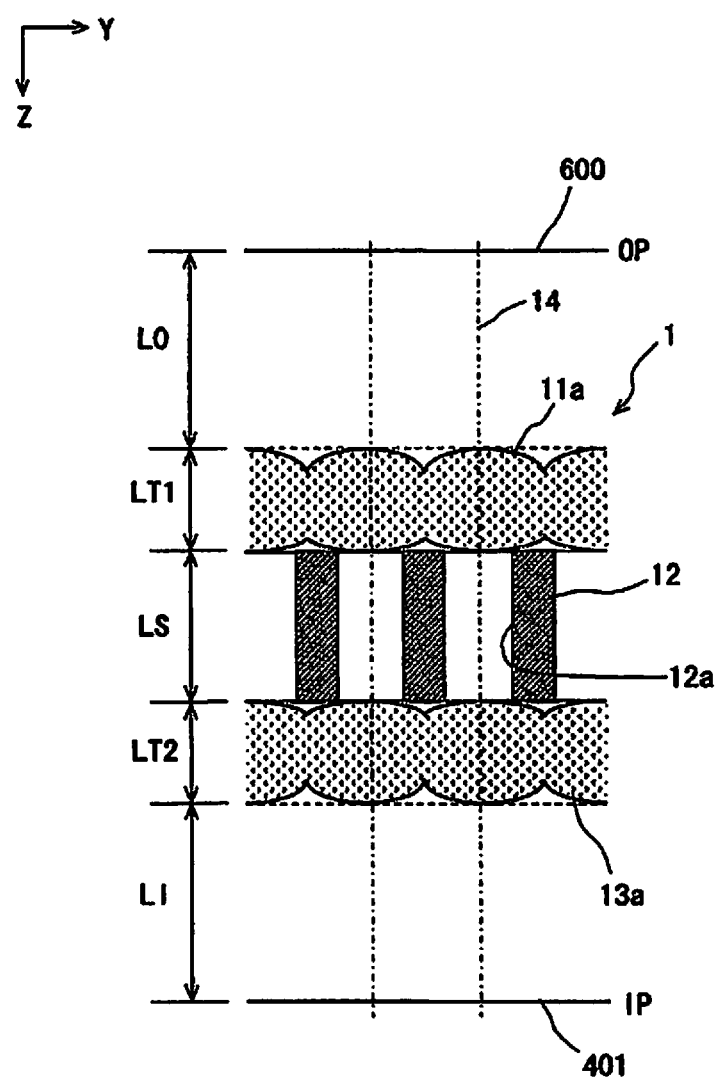
FIG. 14 is a configuration diagram showing the lens unit seen in the X direction of FIG. 13.

FIG. 14 is a configuration diagram showing lens unit 1 seen in the X direction of FIG. 13. Reading head 400 is further described with reference to FIG. 14. In this embodiment, lens unit 1 is disposed in such a way that original document 600 corresponds to object plane OP and line sensor 401 corresponds to image plane IP. Lens unit 1 of this embodiment itself has the same configuration as lens unit 1 of the first embodiment. Moreover, in this embodiment, line sensor 401 has a resolution of 1200 dpi, and 1200 light reception elements are arranged per inch (1 inch=about 25.4 mm). That is, the light reception elements are arranged at a pitch of 0.02117 mm.

The operation of scanner 500 having the above configuration is next described.

Upon lighting of lamp 501, light rays from lamp 501 are reflected by original document 600 and captured by reading head 400. Together with lamp 501, reading head 400 is moved parallel with original document 600 by drive belt 505 driven by motor 506, and captures light rays reflected by the entire surface of the original document. As shown in FIG. 13, the light rays thus reflected by original document 600 are transmitted through platen 502, and then enter lens unit 1 with their optical path bent by mirror 402. Lens unit 1 forms an image of original document 600 on line sensor 401. Line sensor 401 converts the image of original document 600 into electrical signals.

The electronic data, which can be obtained using scanner 500 with lens unit 1 of the invention in this way, is substantially the same as original document 600 in which an image made by forming dots and blanks alternately at a resolution of 1200 dpi and at a dot pitch PD of 0.02117 mm is formed on the entire print region of a print medium. Note that, although scanner 500 in this embodiment uses lens unit 1 of the first embodiment, scanner 500 may use lens unit 101 of the second embodiment.

As described above, by using lens unit 1 according to the invention, the scanner of this embodiment can achieve the same effect as that of the first embodiment. Specifically, since no step is formed at the boundary between two adjacent microlenses, the contrast of an image formed by means of the microlenses can be prevented from being reduced due to stray light, and thereby high-resolution image data can be formed.

In the embodiments described above, the image formation apparatus and the image reading apparatus are described. However, the invention is also applicable to a sensor and a switch configured to convert optical signals into electrical signals, and to an I/O device, a biometric authentication device, a communication device, and a dimension-measurement device which use the aforementioned sensor and switch.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A lens array comprising:
   a first lens row including first lenses arranged in a first direction;
   a second lens row including second lenses arranged in a direction substantially parallel with the first direction;
   a first boundary being a boundary between the first lenses adjacent to each other;
   a second boundary being a boundary between each of the first lenses and the second lens adjacent to the first lens; and
   a first join portion where the first boundary and the second boundary join each other, wherein at the first join portion, the first boundary and the second boundary contact each other at a same height along a direction of an optical axis each of the lenses, as seen in a plane that is substantially orthogonal to the first direction.

2. The lens array according to claim 1, wherein
   a boundary portion defined by an adjacent two of the second boundaries comprises a curved surface.

3. The lens array according to claim 2, wherein an absolute value of a radius of curvature of a curved surface of the boundary portion of the first and second lens is smaller than an absolute value of a radius of curvature of a main body of the first and second lens.

4. The lens array according to claim 1, wherein the optical axes of the first and second lenses are arranged substantially on a virtual line extending in the first direction such that the optical axes of the first and second lenses are located within a predetermined distance from the virtual line in a second direction perpendicular to the first direction and the optical axis of each of the lenses.

5. The lens array according to claim 1, wherein the optical axes of the respective first lenses of the first lens row and the optical axes of the respective second lenses of the second lens row are arranged substantially at a center of the lens array in a second direction perpendicular to the first direction and the optical axis of each of the lenses.

6. The lens array according to claim 1, further comprising
   a third boundary being a boundary between the second lenses adjacent to each other, wherein
   at a second join portion where the second boundary and the third boundary join each other, the second boundary and the third boundary contact each other at a same height along a direction of an optical axis each of the lenses, as seen in the plane that is substantially orthogonal to the first direction.

7. The lens array according to claim 6, wherein
the first lenses and the second lenses are staggered, and
the first join portion and the second join portion are arranged alternately in the first direction.

8. The lens array according to claim 6, wherein
at the second join portion, the second boundary and the third boundary contact each other at a single point corresponding to where an end point of the second boundary contacts an end point of the third boundary, as seen in the plane that is substantially orthogonal to the first direction.

9. The lens array according to claim 1, wherein an absolute value of a radius of curvature of a curved surface at the first join portion is smaller than an absolute value of a radius of curvature of an area of each of the lenses in a vicinity of the optical axis.

10. The lens array according to claim 1, wherein, when a direction perpendicular to the first direction and the optical axis of each of the first and second lenses is defined as a second direction,
the first lenses are formed continuously in the first lens row without any gap between the first lenses adjacent to each other,
the second lenses are formed continuously in the second lens row without any gap between the second lenses adjacent to each other, and
a distance from the optical axis of each of the first and second lenses to the first boundary of the first lens in the first direction is smaller than a radius of the first and second lens about the optical axis of the lens in the second direction.

11. The lens array according to claim 1, wherein the first lenses and the second lenses are symmetric in shape with respect to the second boundary.

12. A lens unit comprising:
a first lens array including lenses arranged in a first direction;
a second lens array including lenses arranged in the first direction; and
a light shield member disposed between the first lens array and the second lens array and including diaphragms arranged in the first direction, wherein
at least one of the first lens array and the second lens array is the lens array according to claim 1.

13. The lens unit according to claim 12, wherein light rays from an object which match optical axes of the lenses of the first lens array are blocked by the light shield member.

14. An exposure device comprising:
a light emission unit; and
a lens unit configured to form an image at a predetermined position from light rays emitted from the light emission unit, wherein
the lens unit is the lens unit according to claim 12.

15. An image formation apparatus comprising:
an electrostatic latent image carrier configured to carry an electrostatic latent image; and
a lens unit configured to form an image on the electrostatic latent image carrier from light rays emitted from a light emission unit, wherein
the lens unit is the lens unit according to claim 12.

16. An LED head comprising:
an LED array; and
a lens unit configured to form an image at a predetermined position from light rays emitted from the LED array, wherein
the lens unit is the lens unit according to claim 12.

17. An image reading apparatus comprising:
a lens unit configured to form an image at a predetermined position from light rays reflected by an original document to be read; and
a converter configured to convert the image into electrical signals, wherein
the lens unit is the lens unit according to claim 12.

18. The lens array according to claim 1, wherein
at the first join portion, the first boundary and the second boundary contact each other at a single point corresponding to where an end point of the first boundary contacts an end point of the second boundary, as seen in the plane that is substantially orthogonal to the first direction.

19. A lens unit comprising:
a first lens array including lenses arranged in a first direction;
a second lens array including lenses arranged in the first direction; and
a light shield member disposed between the first lens array and the second lens array and including diaphragms arranged in the first direction, wherein
the first and second lens arrays are disposed in such a way that optical axes of the lenses of the first lens array substantially match optical axes of the lenses of the second lens array, respectively,
the diaphragms are arranged in such a way that light rays outputted from the lenses of the first lens array are transmitted through the diaphragms and enter the lenses of the second lens array,
when a plane perpendicular to the first direction and passing through the optical axis of each of the first and second lens arrays is defined as a sagittal plane, light rays on the sagittal plane which come from an object are parallel rays in a region between the first lens array and the second lens array and form an inverted image of the object on the sagittal plane,
when a plane perpendicular to the sagittal plane is defined as a meridional plane, a same-size erect image of the object is formed on the meridional plane, and
at least one of the first lens array and the second lens array is the lens array according to claim 1.

20. The lens unit according to claim 19, wherein light rays from the object passing through the optical axes of the lenses of the first lens array are blocked by the light shield member.

* * * * *